(12) United States Patent
Kurokawa et al.

(10) Patent No.: US 10,544,274 B2
(45) Date of Patent: Jan. 28, 2020

(54) PREPREG AND FIBER-REINFORCED COMPOSITE MATERIAL

(71) Applicant: Toho Tenax Co., Ltd., Tokyo (JP)

(72) Inventors: Kazuma Kurokawa, Tokyo (JP);
Hironori Kawamoto, Tokyo (JP);
Yoshitaka Umemoto, Tokyo (JP); Akio Nakaishi, Tokyo (JP)

(73) Assignee: Toho Tenax Co., Ltd., Tokyo (JP)

( * ) Notice: Subject to any disclaimer, the term of this patent is extended or adjusted under 35 U.S.C. 154(b) by 85 days.

(21) Appl. No.: 15/329,098

(22) PCT Filed: Jul. 24, 2015

(86) PCT No.: PCT/JP2015/071147
§ 371 (c)(1),
(2) Date: Jan. 25, 2017

(87) PCT Pub. No.: WO2016/017553
PCT Pub. Date: Feb. 4, 2016

(65) Prior Publication Data
US 2018/0208729 A1    Jul. 26, 2018

(30) Foreign Application Priority Data

Jul. 28, 2014 (JP) ................................ 2014-152997
Apr. 6, 2015 (JP) ................................ 2015-077740

(51) Int. Cl.
*C08J 5/24* (2006.01)
*B32B 5/26* (2006.01)
*B32B 27/12* (2006.01)

(52) U.S. Cl.
CPC .................. *C08J 5/24* (2013.01); *B32B 5/26* (2013.01); *B32B 27/12* (2013.01);
(Continued)

(58) Field of Classification Search
CPC ........ B32B 2260/023; B32B 2260/046; B32B 2262/106; B32B 2307/106; B32B 27/12;
(Continued)

(56) References Cited

U.S. PATENT DOCUMENTS 8,394,491 B2    3/2013 Arai et al.
2008/0145647 A1*  6/2008 Ganguli ................ B29C 70/025
                                                           428/328
(Continued)

FOREIGN PATENT DOCUMENTS

CN         103396576 A      11/2013
JP           52-994 A       1/1977
(Continued)

OTHER PUBLICATIONS

Communication dated May 29, 2017, from the European Patent Office in counterpart European Application No. 15826622.1.
(Continued)

*Primary Examiner* — Camie S Thompson
(74) *Attorney, Agent, or Firm* — Sughrue Mion, PLLC

(57) ABSTRACT

A prepreg includes conductive fibers impregnated with a matrix resin, the prepreg having a conductive region where a conductive material is dispersed in the resin. In the present invention, a resin layer composed of at least the matrix resin preferably is present on one or both surfaces of a conductive fiber layer composed of at least the conductive fibers, and the conductive region is present at least in the resin layer. In addition, the above-described conductive region preferably is present continuously in the thickness direction. The conductive region preferably is a conductive region where the conductive material is dispersed in the matrix resin, and the resin in the conductive region preferably forms a continuous phase with the matrix resin in other regions. A volume
(Continued)

resistivity of the conductive region preferably is $\frac{1}{1,000}$ or less of that of other regions of the matrix resin.

18 Claims, 3 Drawing Sheets

(52) U.S. Cl.
CPC ... *B32B 2260/023* (2013.01); *B32B 2260/046* (2013.01); *B32B 2262/106* (2013.01); *B32B 2307/202* (2013.01); *C08J 2363/00* (2013.01); *C08J 2377/02* (2013.01); *C08J 2381/06* (2013.01)

(58) Field of Classification Search
CPC . B32B 5/26; B32B 2260/021; B32B 2264/10; B32B 2264/105; B32B 2264/108; B32B 2264/12; B32B 2305/076; B32B 2307/202; B32B 2307/212; B32B 27/38; B32B 27/14; B32B 5/24; B32B 5/20; B32B 2264/101; B32B 2264/19; B32B 2264/08; C08J 2363/00; C08J 5/24; C08J 5/042; C08J 5/10; B82Y 30/00; Y10S 428/929; Y10T 428/25; Y10T 428/254; Y10T 428/31504; Y10T 442/2016; Y10T 442/2418; Y10T 442/673; B64D 45/02
USPC ....... 428/297.4, 323, 143, 172, 327; 442/61, 442/393; 174/2; 252/500
See application file for complete search history.

(56) References Cited

U.S. PATENT DOCUMENTS

| | | | |
|---|---|---|---|
| 2008/0295955 A1* | 12/2008 | Cawse | B32B 5/22 156/276 |
| 2011/0174522 A1 | 7/2011 | Simmons et al. | |
| 2015/0184333 A1 | 7/2015 | Arai et al. | |
| 2015/0274911 A1 | 10/2015 | Suzuki et al. | |

FOREIGN PATENT DOCUMENTS

| | | |
|---|---|---|
| JP | 6-344519 A | 12/1994 |
| JP | 8-034864 A | 2/1996 |
| JP | 2008-231395 A | 10/2008 |
| JP | 2009-062473 A | 3/2009 |
| JP | 2010-021534 A | 1/2010 |
| JP | 2010-028104 A | 2/2010 |
| JP | 2011-519749 A | 7/2011 |
| JP | 2013155330 A | 8/2013 |
| JP | 2013-224435 A | 10/2013 |
| WO | 2014011293 A2 | 1/2014 |
| WO | 2014017339 A1 | 1/2014 |
| WO | 2014050896 A1 | 4/2014 |

OTHER PUBLICATIONS

International Search Report for PCT/JP2015/071147 dated Sep. 15, 2015 [PCT/ISA/210].

\* cited by examiner

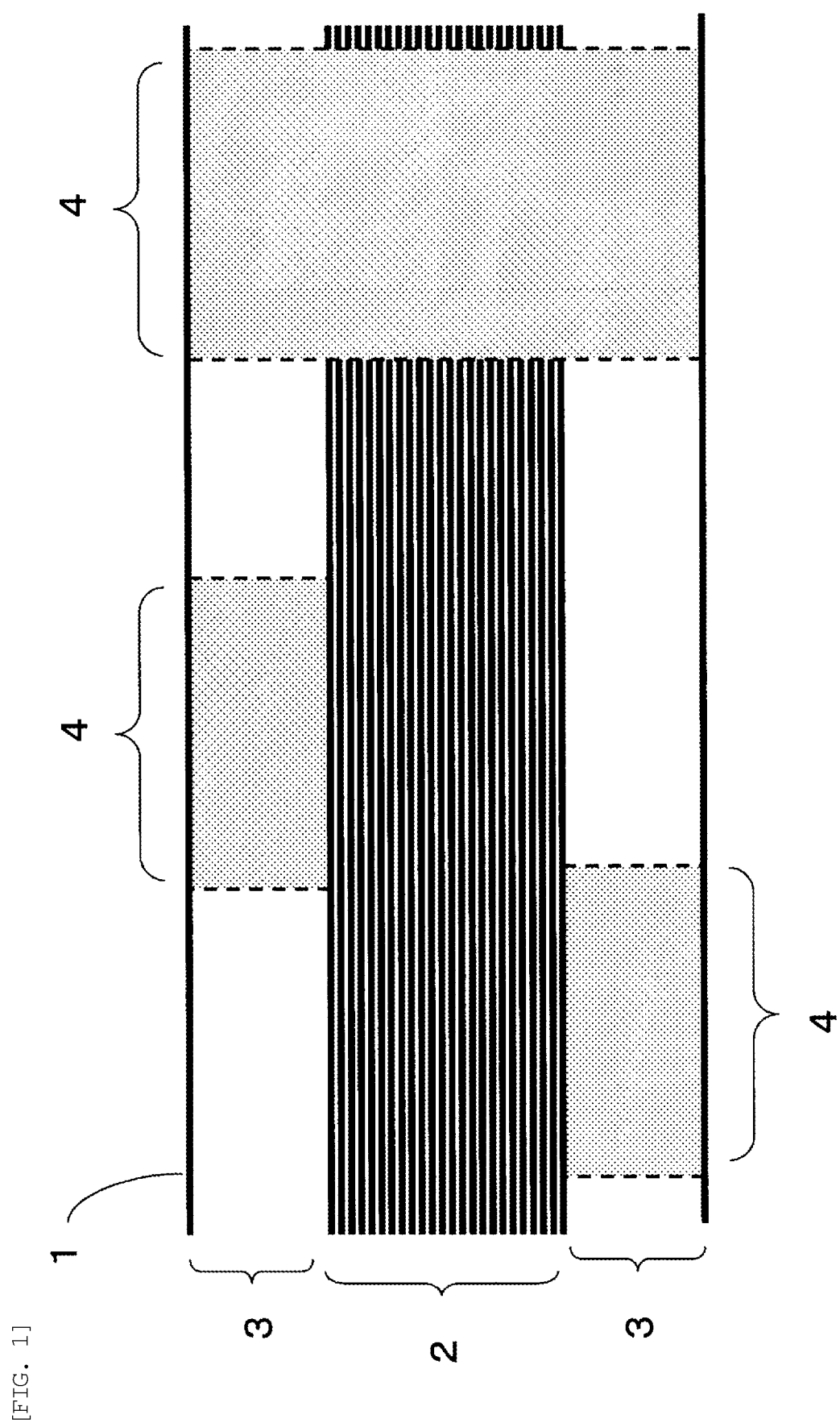
[FIG. 1]

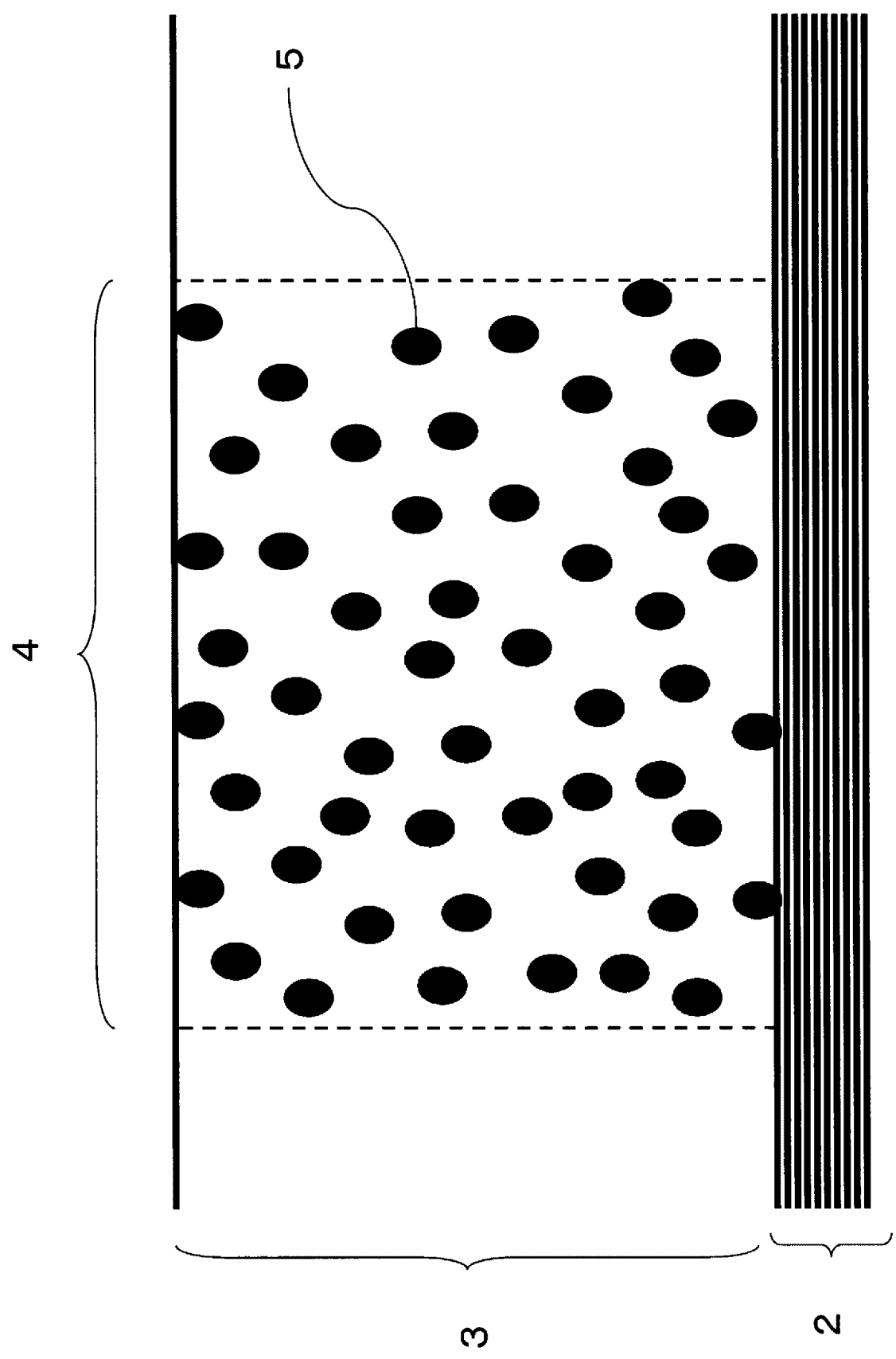
[FIG. 2]

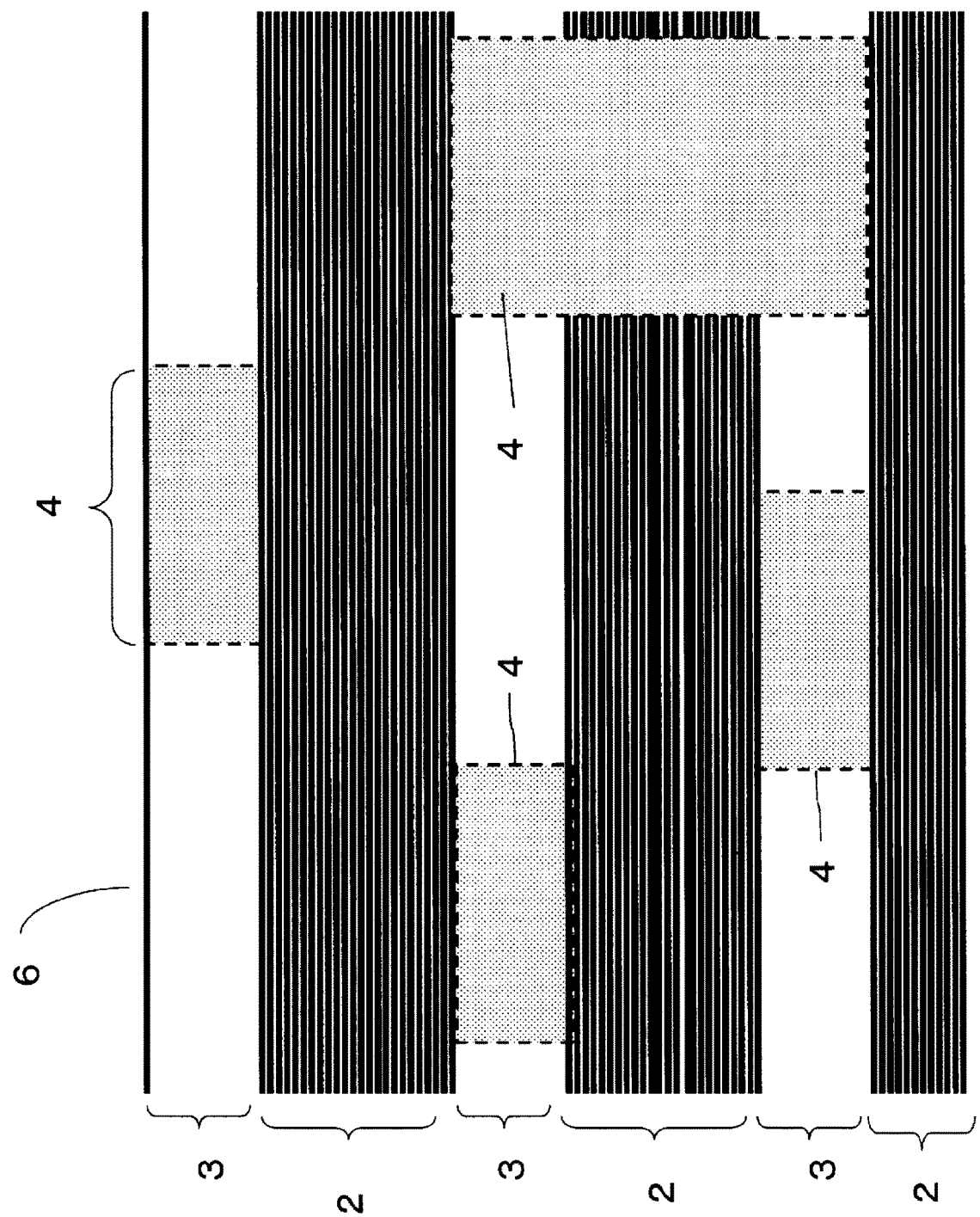
[FIG. 3]

PREPREG AND FIBER-REINFORCED COMPOSITE MATERIAL

CROSS REFERENCE TO RELATED APPLICATIONS

This application is a National Stage of International Application No. PCT/JP2015/071147, filed on Jul. 24, 2015 (which claims priority from Japanese Patent Application Nos. 2014-152997, filed on Jul. 28, 2014, and 2015-077740, filed on Apr. 6, 2015), the contents of which are incorporated herein by reference in their entirety.

TECHNICAL FIELD

The present invention relates to a prepreg capable of producing a fiber-reinforced composite material having excellent mechanical characteristics and conductivity and to a composite material using the same.

BACKGROUND ART

A fiber-reinforced composite material composed of reinforcing fibers and a matrix resin has advantages, such as light weight, nigh strength, high modulus, etc., and is widely applied in aircrafts, sports and leisure, and general industries. This fiber-reinforced composition material is frequently produced via a prepreg in which the reinforcing fibers and the matrix resin are integrated with each other in advance.

The fiber-reinforced composite material that is produced by laminating and forming a prepreg having reinforcing fibers impregnated with a matrix resin generally includes a resin layer composed of the matrix resin between the respective fiber layers laminated. In general, the matrix resin used for the fiber-reinforced composite material is low in conductivity, and therefore, even if a fiber having conductivity is used for the reinforcing fibers, there is encountered such a problem that the conductivity in the thickness direction of the fiber-reinforced composite material is largely impaired by the resin layer between the fiber layers.

As a method of improving the interlayer conductivity, there are proposed a method of blending a metal particle in a resin composition constituting a prepreg (see PTL 1) and a method of blending a carbon particle in a resin composition constituting a prepreg (see PTL 2). In these methods, a large quantity of a conductive material particle is added in order to improve conductivity. But, since such a conductive material particle is low in adhesive properties to the resin, it is liable to become a starting point of fracture in the obtained fiber-reinforced composite material, whereby mechanical characteristics of the composite material are worsened. In addition, in prepreg production, such a conductive material particle largely thickens a resin composition to be impregnated in reinforcing fibers. For that reason, productivity of the prepreg or formability of the composite material is largely impaired. Since the composite material to be produced using such a prepreg involves various faults, such as a void, etc., there is encountered such a problem that mechanical characteristics, such as impact resistance, etc., are markedly worsened.

As a method of making both the impact resistance and the conductivity compatible with each other, for example, PTL 3 proposes a method of partly blending a resin layer of a fiber-reinforced composite material with a conductive particle having an equal diameter to a thickness of the resin layer. However, in this method, a blending amount of the conductive particle is small, so that there is a restriction in improving the conductivity. Furthermore, since the conductive particles are nonuniformly dispersed, there is encountered such a problem that scattering is caused in volume resistivity as an indicator of the conductivity.

CITATION LIST

Patent Literature

PTL 1: JP-A-6-344519
PTL 2: JP-A-8-34864
PTL 3: JP-A-2008-231395

SUMMARY OF INVENTION

Technical Problem

An object of the present invention is to provide a prepreg capable of solving the above-described problems of the conventional technologies and giving a fiber-reinforced composite material having both excellent mechanical characteristics and conductivity and a fiber-reinforced composite material having both excellent mechanical characteristics and conductivity.

Solution to Problem

The prepreg of the present invention that solves the above-described problems is a prepreg comprising conductive fibers impregnated with a matrix resin, the prepreg being a prepreg having a conductive region where a conductive material is dispersed in the resin. In the present invention, it is preferred that a resin layer composed of at least the matrix resin is present on one or both surfaces of a conductive fiber layer composed of at least the conductive fibers, and the conductive region is present at least in the resin layer. In addition, it is preferred that, the above-described conductive region is present continuously in the thickness direction. It is also preferred that the conductive region is a conductive region where the conductive material is dispersed in the matrix resin, and that the resin in the conductive region forms a continuous phase with the matrix resin in other regions. In the present invention, it is preferred that a volume resistivity of the conductive region is $1/1,000$ or less of that of other regions of the matrix resin.

The fiber-reinforced composite material that is another embodiment of the present invention is a fiber-reinforced composite material comprising conductive fibers impregnated with a matrix resin, the fiber-reinforced composite material having a conductive region where a conductive material is dispersed in the resin. The fiber-reinforced composite material of the present invention is preferably a fiber-reinforced composite material in which a resin layer composed of at least a matrix resin is present, between layers resulting from laminating conductive fiber layers composed of at least conductive fibers and a matrix resin is present, and the above-described conductive region is present at least in the resin layer.

A production method of a prepreg of the present invention is a method for producing a prepreg comprising laminating a resin film composed of a matrix resin composition on a conductive fiber base material and integrating the matrix resin composition with the conductive fiber base material, the resin film being a conductive material-localized resin film in which a conductive material is localized in a part of the film composed of the matrix resin composition. The conductive material-localized resin film is preferably a conductive material-localized resin film obtained by disposing the conductive material on a surface of the film composed of the matrix resin, and also preferably a conductive material-localized resin film obtained by disposing the conductive material on a support and then transferring the conductive material onto the film composed of the matrix resin.

Another production method of a prepreg of the present invention is a method for producing a prepreg comprising integrating a matrix resin composition with a conductive fiber-base material, the conductive fiber base material being a conductive fiber base material in which a conductive material is localized on a part of a surface thereof in advance.

Advantageous Effects of Invention

In accordance with the prepreg of the present invention, it is possible to obtain a carbon fiber-reinforced composite material having both excellent conductivity and mechanical characteristics.

Since the fiber-reinforced composite material of the present invention has both excellent conductivity and mechanical characteristics, it is applicable to a lot of applications requiring improvements in electromagnetic shielding, electrostatic protection, current return, and conductivity. In particular, the fiber-reinforced composite material of the present invention is able to be used for the purpose of solving various electromagnetic problems in aerospace parts, wind turbines, pressure vessels, buildings, ships, trains, automobiles, fuel tanks, and other fields.

BRIEF DESCRIPTION OF DRAWINGS

FIG. 1 is a conceptual view showing one embodiment of the prepreg of the present invention.

FIG. 2 is a conceptual view showing one embodiment of a conductive region of the prepreg of the present invention in more detail.

FIG. 3 is a conceptual view showing one embodiment of the fiber-reinforced composite material of the present invention.

REFERENCE SIGNS LIST

1: Prepreg
2: Conductive fiber layer
3: Resin layer
4: Conductive region
5: Conductive material
6: Fiber-reinforced composite material

DESCRIPTION OF EMBODIMENTS

The prepreg of the present invention is a prepreg comprising conductive fibers impregnated with a matrix resin, the prepreg being a prepreg having a conductive region where a conductive material is dispersed in the resin. In the prepreg of the present invention, the conductive region where the conductive material is dispersed forms a conductive path, and therefore, it exhibits excellent conductivity in the thickness direction thereof. In the present invention, a lot of conductive materials are localized in a high density in the conductive region and come close to each other. Therefore, the prepreg of the present invention is high in energizing efficiency, and even if an addition amount of the conductive material occupying in the whole of the prepreg is a few, it exhibits high conductivity. In the present invention, it is preferred that a resin layer composed of at least the matrix resin is present on one or both surfaces of a conductive fiber layer composed of at least, the conductive fibers, and the conductive region is present at least in the resin layer. In the prepreg having such a construction, the conductive region where the conductive material is dispersed effectively forms a conductive path between the prepreg surface and the conductive fiber layer, and therefore, the prepreg of the present invention exhibits more excellent conductivity in the thickness direction thereof.

Embodiments of the present invention are hereunder described in detail by reference to the accompanying drawings. FIG. 1 is a conceptual view showing a preferred embodiment of the prepreg of the present invention. In FIG. 1, [1] denotes a prepreg, and the prepreg is constructed of a conductive fiber layer [2] in which a matrix resin is impregnated in conductive fibers and a resin layer [3] composed of the matrix resin disposed on a surface of the conductive fiber layer. In FIG. 1, the conductive fibers are formed in a sheet shape in which plural single fibers are arranged in parallel in one direction.

Furthermore, the prepreg of the present invention is a prepreg including a conductive region [4]. As shown in FIG. 2, such a conductive region [4] is a region where a conductive material [5] is dispersed in the resin. In the present invention, the conductive material is localized in a high density in the conductive region, and therefore, the prepreg of the present invention is high in energizing efficiency, and even if an addition amount of the conductive material occupying in the whole of the prepreg is a few, it exhibits high conductivity.

In the prepreg of the present invention, it, is preferred that the conductive region where the conductive material is dispersed is present continuously in the thickness direction. When the conductive region is present continuously in the thickness direction, the conductive region more effectively forms a conductive path between the prepreg surface and the conductive fiber layer or an opposite prepreg surface, and therefore, the prepreg of the present invention exhibits especially excellent conductivity in the thickness direction. In the present invention, it is preferred that the conductive region occupies 80% or more of the thickness of the resin layer in the thickness direction, and it is more preferred that the conductive region is present piercing through the resin layer. In addition, in the present invention, it is preferred that the conductive region comes into contact with the conductive fiber layer, and it is also preferred that the conductive region is present in the conductive fiber layer.

The fiber-reinforced composite material that is another embodiment of the present invention is a fiber-reinforced composite material comprising conductive fibers impregnated with a matrix resin, the fiber-reinforced composite material having a conductive region where a conductive material is dispersed in the resin. The fiber-reinforced composite material of the present invention is preferably a fiber-reinforced composite material in which a resin layer composed of at least a matrix resin is present between layers resulting from laminating conductive fiber layers composed of at least conductive fibers and a matrix resin, and the above-described conductive region is present at least in the resin layer. FIG. 3 is a conceptual view showing a preferred embodiment of the composite material of the present invention. The fiber-reinforced composite material that is another embodiment of the present invention is a fiber-reinforced composite material [6] comprising conductive fibers impregnated with a matrix resin, in which the conductive region [4] where the conductive material [5] is dispersed in the resin is present. In the present invention, the fiber-reinforced composite material is preferably a fiber-reinforced composite material in which the resin layer [3] composed of a matrix resin is present between layers resulting from laminating the conductive fiber layers [2] composed of conductive fibers and a matrix resin, and the conductive region [4] is present in the above-described resin layer.

The fiber-reinforced composite material of the present invention exhibits excellent conductivity in the thickness direction because the conductive region where the conductive material is dispersed forms a conductive path. In the present invention, the conductive material is localized in a high density in the conductive region, and therefore, the fiber-reinforced composite material of the present, invention is high in energizing efficiency, and even if an addition amount of the conductive material occupying in the whole of the composite material is a few, it exhibits high conductivity.

In the present invention, it is preferred that the resin in the conductive region forms a continuous phase with the matrix resin of the resin layer. In view of the fact that the resin in the conductive region forms a continuous phase with the matrix resin of the resin layer, fracture in a boundary region between the conductive region and the resin layer is inhibited, and therefore, the mechanical characteristics of the fiber-reinforced composition material are improved. In addition, the resin in the conductive region is more preferably a matrix resin.

In the present invention, a volume resistivity of the conductive region is preferably 1/1,000 or less of that of other regions of the matrix resin. In addition, the volume resistivity of the conductive region is preferably $10^3$ Ωcm to $10^{-9}$ Ωcm, more preferably 1 Ωcm to $10^{-9}$ Ωcm, and still more preferably $10^{-2}$ to $10^{-9}$ Ωcm. The volume resistivity of the conductive region is determined by measuring a volume resistivity of resin pieces resulting from dispersing the conductive material that forms the conductive region in the resin that forms the conductive region so as to have a volume occupation rate the same as in the conductive region. The volume resistivity of other region of the matrix resin is determined by measuring the volume resistivity of the resin resulting from curing the matrix resin composition.

In addition, as for the conductive region, it is preferred that the conductive material is dispersed in the resin such that the rate of volume occupation is 20 to 95 volume %. An addition amount of the conductive material occupying in the whole of the prepreg is preferably 20 mass % or less, more preferably 10 mass % or less, still more preferably 5 mass % or less, and especially preferably 1 mass % or less. Although a lower limit of the addition amount of the conductive material occupying in the whole of the prepreg is not particularly limited, from the viewpoint, of conductivity of the obtained composite material, it is preferably 0.0005 mass % or more, and more preferably 0.001 mass % or more.

In the present invention, in the case where the conductive region is present in the resin layer, a thickness of the single conductive region is preferably 80% or more of the thickness of the resin layer, and in the case where the conductive region is present piercing through the conductive fiber layer, a thickness of the single conductive region is preferably 90% or more of the thickness of the prepreg. In addition, the thickness of the single conductive region is preferably 1 to 3,000 μm, and more preferably 10 to 300 μm.

In the present invention, the conductive region may be present continuously, for example, in a linear state or lattice state in a cross section of the planar direction of the prepreg, or may also be present discontinuously, for example, in a dotted state or island state. From the viewpoint of mechanical characteristics of the composite material, it is preferred that the conductive region is present discontinuously. In the case where the conductive region is present discontinuously, though the shape of the single conductive region is not particularly limited, a cross-sectional shape of the prepreg in the planar direction is preferably circular or elliptic. An area of the conductive region occupying in the cross-sectional area of the prepreg in the planar direction is preferably 50% or less, more preferably 10% or less, still more preferably 5% or less, and especially preferably 1% or less. Although a lower limit of the area of the conductive region occupying in the cross-sectional area of the prepreg in the planar direction is not particularly limited, from the viewpoint of uniformity of the conductivity of the obtained composite material, it is preferably 0.001% or more, more preferably 0.005% or more, and still more preferably 0.01% or more. In addition, in order that, both conductivity and mechanical strength of the composite material may be readily made compatible with each other, the cross-sectional area of the single conductive region in the planar direction is preferably 0.01 to 500,000 μm², more preferably 0.1 to 100,000 μm², and still more preferably 1 to 10,000 μm².

In the present invention, from the viewpoint of mechanical characteristics of the fiber-reinforced composite material, the rate of volume occupation of the conductive region occupying in the matrix resin is preferably 50 volume % or less, more preferably 10 volume % or less, and still more preferably 5 volume % or less. Although a lower limit of the rate of volume occupation is not particularly limited, from the viewpoint of conductivity of the obtained composite material, it is preferably 0.0001 volume % or more, more preferably 0.0005 volume % or more, still more preferably 0.001 volume % or more, and especially preferably 0.01 volume % or more. In the present invention, as for the conductive region, the conductive material is localized in a high density in, and its energizing efficiency is high. Therefore, even if the rate of volume occupation is low, good conductivity can be revealed in the thickness direction. In addition, when a volume of the single conductive region is 0.1 μm³ to 1 mm³, both conductivity and mechanical strength of the composite material are readily made compatible with each other, and hence, such is preferred. The volume of the single conductive region is more preferably 0.5 μm³ to 0.5 mm³, and still more preferably 1 μm³ to 0.1 mm³.

Each of components constructing the prepreg and the fiber-reinforced composite material of the present invention is hereunder described.

(1) Conductive Fiber:

The fiber that is used as the conductive fiber is not particularly limited so long as it is a fiber having conductivity, and examples thereof include a carbon fiber, a silicon carbide fiber, and a metal fiber. In addition, reinforcing fibers resulting from covering a surface of a fiber, such as a carbon fiber, a glass fiber, an aramid fiber, a polyester fiber, a ceramic fiber, an alumina fiber, a boron fiber, a silicon carbide fiber, a mineral fiber, a rock fiber, a slug fiber, etc., with a conductive substance by a method, for example, metal plating treatment, etc., can also be used.

Of those conductive fibers, a carbon fiber is more preferred from the standpoint of obtaining a fiber-reinforced composite material that is good in specific strength and specific modulus, light in weight, and high in strength. A polyacrylonitrile (PAN)-based carbon fiber is especially preferred from the standpoint of excellent tensile strength.

In the case of using a PAN-based carbon fiber, its tensile modulus is preferably 100 to 600 GPa, more preferably 200 to 500 GPa, and especially preferably 230 to 450 GPa. In addition, the tensile strength is 2,000 MPa to 10,000 MPa, and preferably 3,000 to 8,000 MPa. A diameter of the carbon fiber is preferably 4 to 20 μm, and more preferably 5 to 10 μm. By using such a carbon fiber, mechanical properties of the obtained composite material can be improved.

It is preferred that the conductive fiber is formed into a sheet-like base material and then used. Examples of the conductive fiber base material sheet may include a sheet resulting from arranging a lot of fibers in parallel in one direction, a bidirectional woven fabric, such as a plain woven fabric, a diagonal cloth, etc., a multi-axial woven fabric, a nonwoven fabric, a mat, a knitted fabric, a braid, a pager resulting from paper making of a conductive fiber, and so on.

A thickness of the sheet-like conductive fiber base material is preferably 0.01 to 3 mm, and more preferably 0.1 to 1.5 mm. Such a conductive fiber base material sheet may contain a known sizing agent in a known content.

In addition, what the conductive substance is attached onto the surface of the conductive fiber is preferred for the purpose of improving the conductivity of the fiber layer of the obtained composite material. A method of attaching the conductive substance onto the surface of the conductive fiber is not particularly limited, and examples thereof include a method of attaching a sizing agent containing a conductive substance, a method of performing a plating treatment on the fiber surface, a method of allowing a nano structure, such as a metal, carbon, etc., to grow on the fiber surface, and the like. Above all, a method of attaching a sizing agent containing a conductive substance is preferred. An amount of the conductive substance to be attached onto the conductive fiber is preferably 0.01 to 10 mass %, and more preferably 0.1 to 5 mass % relative to the fiber weight. As the conductive substance to be attached onto the conductive fiber, a conductive material that forms the conductive region, as described later, can be used.

(2) Matrix Resin:

The matrix resin that is used in the present invention is not particularly limited, and for example, a hardening resin or a thermoplastic resin can be used.

In the case of using a hardening resin as the matrix resin, a thermosetting resin is preferred because it is able to produce a fiber-reinforced composite material having high heat resistance. From the viewpoints of heat resistance and mechanical characteristics, the thermosetting resin is preferably a thermosetting resin of allowing a crosslinking reaction, to proceed by heat, thereby forming at least partially a three-dimensional crosslinking structure.

Examples of the hardening resin that is used as the matrix resin include an unsaturated polyester resin, a vinyl ester resin, an epoxy resin, a bismaleimide resin, a benzoxazine resin, a triazine resin, a phenol resin, a urea resin, a melamine resin, a polyimide resin, and the like. Furthermore, modified products or blend resins of two or more kinds thereof, and so on can also be used. Such a hardening resin may be a resin that undergoes self-curing upon heating, or may also be a resin that undergoes curing upon being blended with a curing agent, a curing promoter, or the like.

Of those hardening resins, an epoxy resin and a bismaleimide resin each having an excellent balance among heat resistance, mechanical characteristics, and adhesive properties to a carbon fiber are preferred. From the standpoint of mechanical characteristics, an epoxy resin is more preferred, whereas from the standpoint of heat resistance, a bismaleimide resin is more preferred.

Although the epoxy resin is not particularly limited, examples thereof include bifunctional epoxy resins, such as a bisphenol type epoxy resin, an alcohol type epoxy resin, a biphenyl type epoxy resin, a hydrophthalic acid type epoxy resin, a dimeric acid type epoxy resin, an alicyclic-type epoxy resin, etc.; glycidyl type epoxy resins, such as tetrakis (glycidyloxyphenyl)ethane and tris(glycidyloxyphenyl) methane; glycidyl amine type epoxy resins, such as tetraglycidyl diaminodiphenylmethane; naphthalene type epoxy resins; novolak type epoxy resins, such as a phenol novolak type epoxy resin and a cresol novolak type epoxy resin; and the like.

Furthermore, there are exemplified polyfunctional epoxy resins, such as a phenol type epoxy resin, etc., and the like. Moreover, various modified epoxy resins, such as a urethane-modified epoxy resin, a rubber-modified epoxy resin, etc., can also be used.

Above all, an epoxy resin having an aromatic group in a molecule thereof is preferably used, and an epoxy resin having any of a glycidyl amine structure and a glycidyl ether structure is more preferred. In addition, an alicyclic-type epoxy resin can also be suitably used.

Examples of the epoxy resin having a glycidyl amine structure include various isomers of N,N,N',N'-tetraglycidyl diaminodiphenylmethane, N,N,O-triglycidyl-p-aminophenol, N,N—O-triglycidyl-m-aminophenol, N,N,O-triglycidyl-3-methyl-4-aminophenol, and triglycidyl aminocresol, and the like.

Examples of the epoxy resin having a glycidyl ether structure include a bisphenol A-type epoxy resin, a bisphenol F-type resin, a bisphenol S-type epoxy resin, a phenol novolak type epoxy resin, and a cresol novolak type epoxy resin.

Such an epoxy resin may have a nonreactive substituent, such as an aromatic ring structure, as the need arises. Examples of the nonreactive substituent include an alkyl group, such as methyl, ethyl, isopropyl, etc., an aromatic group, such as phenyl, etc., an alkoxyl group, an aralkyl group, a halogen group, such as chlorine, bromine, etc., and the like.

Examples of the bisphenol type epoxy resin include a bisphenol A-type resin, a bisphenol F-type resin, a bisphenol AD-type resin, a bisphenol S-type resin, and the like. Specifically, examples thereof include jER815 (trade name), jER828 (tradename), jER834 (tradename), jER1001 (tradename), and jER807 (trade name), all of which are manufactured by Japan Epoxy Resin Co., Ltd., Epomix R-710 (trade name), manufactured by Mitsui Petrochemical Industries, Ltd., EXA1514 (trade name), manufactured by Dainippon Ink and Chemicals, Inc., and the like.

Examples of the alicyclic-type epoxy resin include Araldite CY-179 (trade name), CY-178 (trade name), CY-182 (trade name), and CY-183 (trade name), all of which are manufactured by Huntsman, and the like.

Examples of the phenol novolak type epoxy resin include jER152 (trade name) and jER154 (trade name), all of which are manufactured by Japan Epoxy Resin Co., Ltd., DEN431 (trade name), DEN485 (trade name), and DEN438 (trade name), all of which are manufactured by The Dow Chemical company, Epiclon N740 (trade name), manufactured by DIC Corporation, and the like; and examples of the cresol novolak type epoxy resin include Araldite ECN1235 (trade name), ECN1273 (trade name), and ECN1280 (trade name), all of which are manufactured by Huntsman, EOCN102

(trade name), EOCN103 (trade name), and EOCN104 (trade name), all of which are manufactured by Nippon Kayaku Co., Ltd., and the like.

Examples of the various modified epoxy resins include urethane-modified bisphenol A epoxy resins, such as Adeka Resin EPU-6 (trade name) and EPU-4 (trade name), all of which are manufactured by Asahi Denka Kogyo K.K., and the like.

These epoxy resins can be properly selected and used solely or in admixture of two or more thereof. Of those, the bifunctional epoxy resin represented by a bisphenol type includes resins of various grades of from a liquid form to a solid form depending upon a difference of molecular weight. In consequence, it is favorable to blend such a resin for the purpose of adjusting the viscosity of the matrix resin for prepreg.

As a bismaleimide compound (hereinafter also referred to as "BMI") that is used as the bismaleimide resin, a conventionally known bismaleimide compound can be used. Examples thereof include a bismaleimide compound represented by the following formula (1).

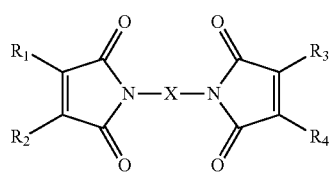
(1)

In the formula (1), $R_1$ to $R_4$ each independently represent a group selected from the group consisting of —H, —CH$_3$, —C$_2$H$_5$, —C$_3$H$_7$, —F, —Cl, —Br, and —I. X is described later.

As a bismaleimide resin composition, it is preferred to jointly use a bismaleimide compound containing an aromatic ring structure and a bismaleimide compound not containing an aromatic ring structure. By jointly using these compounds, handling properties of the obtained prepreg can be improved.

Examples of the bismaleimide compound containing an aromatic ring structure (hereinafter referred to as "aromatic bismaleimide compound") include compounds having a structure in which X in the formula (1) is one described in each of the following formulae (2) to (8).

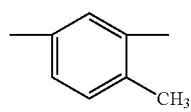
(2)

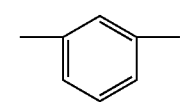
(3)

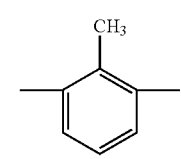
(4)

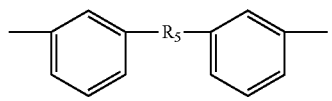
(5)

In the formula (5), $R_5$ represents —CH$_2$—, —C(CH$_3$)$_2$—, —O—, or —SO$_2$—.

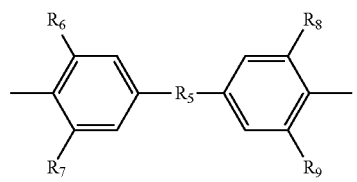
(6)

In the formula (6), $R_5$ represents —CH$_2$—, —C(CH$_3$)$_2$—, —O—, or —SO$_2$—; and $R_6$ to $R_9$ each independently represent a group selected from the group consisting of —H, —CH$_3$, —C$_2$H$_5$, —C$_3$H$_7$, —F, —Cl, —Br, and —I.

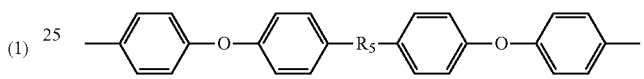
(7)

In the formula (7), $R_5$ represents —CH$_2$—, —C(CH$_3$)$_2$—, —O—, or —SO$_2$—.

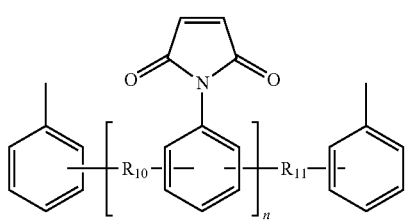
(8)

In the formula (8), $R_{10}$ to $R_{11}$ each independently represent —CH$_2$—, —C(CH$_3$)$_2$—, —O—, or —SO$_2$. In the formula (8), n is 0 to 0.5.

Examples of such an aromatic bismaleimide compound may include N,N'-4,4'-diphenylmethane bismaleimide, N,N'-4,4'-diphenyl ether bismaleimide, N,N'-m-phenylene bismaleimide, N,N'-p-phenylene bismaleimide, N,N'-m-toluylene bismaleimide, N,N'-4,4'-biphenylene bismaleimide, N,N'-4,4'-(3,3'-dimethylbiphenylene) bismaleimide, 2,2-bis[4-(4-maleimidephenoxy)phenyl]propane, 3,3'-dimethyl-5,5'-diethyl-4,4'-diphenylmethane bismaleimide, 4-methyl-1,3-phenylene bismaleimide, N,N'-4,4'-diphenylsulfone bismaleimide, N,N'-4,4'-benzophenone bismaleimide, and the like.

From the viewpoint of heat resistance of the fiber-reinforced composite material after heat curing, N,N'-4,4'-diphenylmethane bismaleimide, N,N'-4,4'-diphenyl ether bismaleimide, N,N'-m-toluylene bismaleimide, 2,2-bis[4-(4-maleimidephenoxy)phenyl]propane, 4-methyl-1,3-phenylene bismaleimide, N,N'-4,4'-diphenylsulfone bismaleimide, and N,N'-4,4'-benzophenone bismaleimide are preferred; and N,N'-4,4'-diphenylmethane bismaleimide, N,N'-4,4'-diphenyl ether bismaleimide, N,N'-m-toluylene bismaleimide, 2,2-bis[4-(4-maleimidephenoxy)phenyl]propane, and 4-methyl-1,3-phenylene bismaleimide are especially preferred. These aromatic bismaleimide compounds may be used solely or may be used in combination of two or more thereof.

Examples of the bismaleimide compound not containing an aromatic ring structure (hereinafter referred to as "aliphatic bismaleimide compound") include compounds having a structure in which X in the formula (1) is one described in each of the following formulae (9) to (11).

(9)

In the formula (9), n is an integer of 10 or less, and preferably 1, 2, 3, 4, or 6.

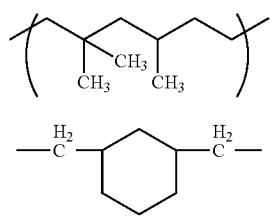
(10)

(11)

Examples of such an aliphatic bismaleimide compound may include 1,6'-bismaleimide-(2,2,4-trimethyl)hexane, hexamethylenediamine bismaleimide, N,N'-1,2-ethylene bismaleimide, N,N'-1,3-propylene bismaleimide, and N,N'-1,4-tetramethylene bismaleimide. Of those, 1,6'-bismaleimide-(2,2,4-trimethyl)hexane and hexamethylenediamine bismaleimide are especially preferred. These aliphatic bismaleimide compounds may be used solely or may be used in combination of two or more thereof.

It is preferred that a curing agent of the bismaleimide compound is contained in the bismaleimide resin composition, in addition to the above-described bismaleimide compound. Examples of the curing agent of the bismaleimide compound include alkenyl phenol and/or alkenyl phenol ether compounds.

The alkenyl phenol ether is obtained through a reaction between a phenol-based compound and an alkenyl halide, and the alkenyl phenol is obtained through Claisen rearrangement of the alkenyl phenol ether (see JP-A-52-994). The alkenyl phenol and/or alkenyl phenyl ether compound that is contained in the bismaleimide resin composition may include a rearranged product thereof.

The alkenyl phenol and/or alkenyl phenyl ether is preferably allyl phenol, methallyl phenol, or an ether thereof. Compounds of the following formulae (12) to (16) are more preferred as the alkenyl phenol or alkenyl phenol ether.

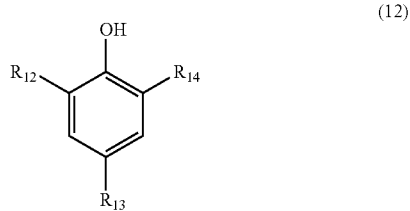
(12)

In the formula (12), $R_{12}$, $R_{13}$, and $R_{14}$ are each independently hydrogen or an alkenyl group having 2 to 10 carbon atoms, and preferably an allyl group or a propenyl group, provided that at least one of $R_{12}$, $R_{13}$, and $R_{14}$ is an alkenyl group having 2 to 10 carbon atoms.

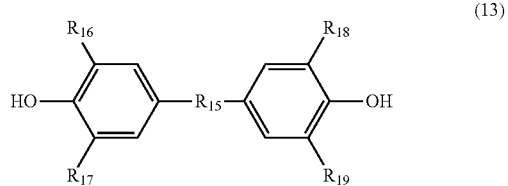
(13)

In the formula (13), $R_{15}$ is a direct bond, —$CH_2$—, —$C(CH_3)_2$—, —O—, —S—, —SO—, or —$SO_2$—; and $R_{16}$, $R_{17}$, $R_{18}$, and $R_{19}$ are each independently hydrogen or an alkenyl group having 2 to 10 carbon atoms, and preferably an allyl group or a propenyl group, provided that at least one of $R_{16}$, $R_{17}$, $R_{18}$, and $R_{19}$ is an alkenyl group having 2 to 10 carbon atoms.

Among the compounds of the formula (13), compounds of the following formula (14) are especially preferred.

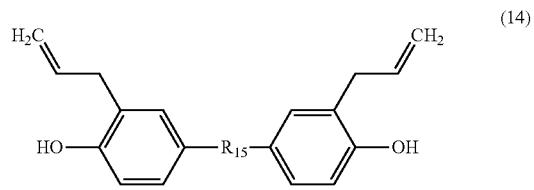
(14)

In the formula (14), $R_{15}$ represents a direct bond, —$CH_2$—, —$C(CH_3)_2$—, —O—, —S—, —SO—, or —$SO_2$—.

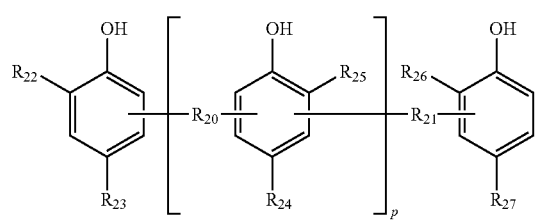
(15)

In the formula (15), $R_{20}$ and $R_{21}$ are each a direct bond, —$CH_2$—, —$C(CH_3)_2$—, —O—, —S—, —SO—, or —$SO_2$—; $R_{22}$, $R_{23}$, $R_{24}$, $R_{25}$, $R_{26}$, and $R_{27}$ are each independently hydrogen, an alkyl group having 1 to 4 carbon atoms, or an alkenyl group having 2 to 10 carbon atoms, and preferably an allyl group or a propenyl group, provided that at least one of $R_{10}$, $R_{11}$, $R_{12}$, $R_{13}$, $R_{14}$, and $R_{15}$ is an alkenyl group having 2 to 10 carbon atoms; and p is an integer of 0 to 10.

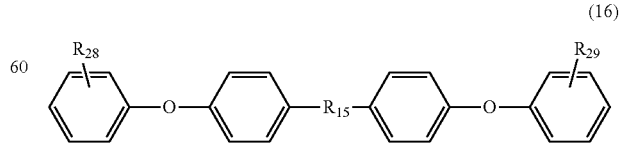
(16)

In the formula (16), $R_{15}$ represents a direct bond, —$CH_2$—, —$C(CH_3)_2$—, —O—, —S—, —SO—, or —$SO_2$—; and $R_{28}$ and $R_{29}$ are each independently hydrogen, an alkyl group having 1 to 4 carbon atoms, or an alkenyl group having 2 to 10 carbon atoms, and preferably an allyl group or a propenyl group, provided that at least one of $R_{28}$ and $R_{29}$ is an alkenyl group having 2 to 10 carbon atoms.

Examples of such an alkenyl phenol or alkenyl phenol ether compound may include O,O'-diallylbisphenol A, 4,4'-dihydroxy-3,3'-diallyldiphenyl, bis(4-hydroxy-3-allylphenyl)methane, 2,2'-bis(4-hydroxy-3,5-diallylphenyl)propane, 2,2'-diallylbisphenol F, 4,4'-dihydroxy-3,3'-diallyldiphenyl ether, 4,4'-bis-O-propenylphenoxy-benzophenone, and the like. Of those, O,O'-diallylbisphenol A, 2,2'-bis(4-hydroxy-3,5-diallylphenyl)propane, 2,2'-diallylbisphenol F, and the like are preferred because a glass transition point of the resin after heat curing is high. O,O'-Diallylbisphenol A is especially preferred because it decreases the viscosity of the resin composition. The alkenyl phenol and/or alkenyl phenol ether may be used solely or may be used in admixture of two or more thereof.

When the bismaleimide resin composition properly contains the alkenyl phenol and/or alkenyl phenol ether compound in an arbitrary range, the viscosity is adjusted, and good forming processability can be obtained. In addition, by thoroughly impregnating the resin composition within the conductive fiber base material, the resin composition can be thoroughly adhered to the conductive fiber base material.

In the bismaleimide resin composition, a part or the whole of the aromatic bismaleimide compound and/or aliphatic bismaleimide compound may be dissolved in the alkenyl phenol and/or alkenyl phenol ether compound.

Examples of the thermoplastic resin that is used as the matrix resin may include polyolefin-based resins, such as a polyethylene resin, a polypropylene resin, and a copolymer or blend thereof; aliphatic polyamide-based resins, such as polyamide 66, polyamide 6, polyamide 12, etc.; semi-aromatic polyamide-based resins having an aromatic component as an acid component; aromatic polyester-based resins, such as a polyethylene terephthalate resin (PET), a polybutylene terephthalate resin (PBT), etc.; polycarbonate-based resins; polystyrene-based resins (e.g., a polystyrene resin, an AS resin, an ABS resin, etc.); aliphatic polyester-based resins, such as a polylactic acid-based resin, etc.; and the like.

(3) Conductive Material:

The prepreg of the present invention has a conductive region where the conductive material is dispersed in the resin. Although the resin that disperses the conductive material therein is not particularly limited, it is preferably a resin having compatibility with the matrix resin, and more preferably a resin of the same kind as the base resin contained in the matrix resin.

The conductive material that is used, in the present invention has only to be a conductive substance functioning as an electrically good conductor and is not limited to only the conductor. The conductive material is a conductive substance having a volume resistivity of preferably 100 to $10^{-9}$ Ωcm, more preferably 10 to $10^{-9}$ Ωcm, still more preferably 1 to $10^{-9}$ Ωcm, and especially preferably $10^{-1}$ to $10^{-9}$ Ωcm. When the volume resistivity is lower, the conductivity of the obtained carbon fiber-reinforced composite material can be more efficiently improved.

The conductive material that is used in the present invention is preferably a conductive material, a minimum diameter of which is smaller than a fiber diameter of the conductive fiber to be used. When the minimum diameter of the conductive material is smaller than the fiber diameter of the conductive fiber to be used, the conductive material readily comes into spaces among single fibers of the conductive fiber, thereby readily allowing the conductive region to bring into close contact into the conductive fiber layer. Thus, the conductivity of the obtained composite material can be more enhanced. The minimum diameter of the conductive material that is used in the present invention is preferably 1 nm to 3 μm, more preferably 5 nm to 1 μm, and still more preferably 10 nm to 0.5 μm.

As the conductive material, for example, a metal material, a carbon material, a conductive polymer, or substances resulting from covering a core material of an inorganic material or an organic material with a conductive substance, and so on can be used. In addition, in the present invention, the conductive material that is used for the prepreg has only to be a conductive substance functioning as an electrically good conductor after being formed into the composite material. It may also be a substance that is converted into a conductor at a forming temperature of the composite material. A forming temperature of the composite material is generally 80 to 300° C., and examples of the substance that is converted into a conductor at such a temperature include organic metal compounds, organic metal complexes, and the like.

Of the above-described conductive materials, a metal material and a carbon material are preferred because they exhibit high conductivity and stability.

As the metal material, platinum, gold, silver, copper, tin, nickel, titanium, cobalt, zinc, iron, chromium, aluminum, or an alloy containing such a metal as a main component, or the like is preferred because it is able to prevent corrosion to be caused due to a potential difference between the metal material and the carbon fiber from occurring. Furthermore, tin oxide, indium oxide, indium oxide-tin (ITO), and the like are also preferred. Of those, platinum, gold, silver, copper, tin, nickel, titanium, or an alloy containing such a metal as a main component is especially preferred because it exhibits high conductivity and chemical stability.

A form of the conductive material, that is used in the present invention is not particularly limited, and a conductive material in a filler or continuous body state, or the like can be used. In the present invention, the form of the conductive material is preferably in a filler state from the standpoint that the conductive region is readily formed.

The filler as referred to in the present invention refers to a form in a discontinuous body state and is preferably a conductive material having an aspect ratio of 1 to 1,000. As the conductive material in a filler state, for example, a conductive material in a granular state, fibrous state, or star-shaped state can be used. In the case of using a filler in a granular state, an average particle diameter thereof is not particularly limited so long as it is a size such that the filler can be filled within the matrix resin of the prepreg. It is preferably 0.001 to 10 μm, more preferably 0.005 to 3 μm, still more preferably 0.01 to 1 μm, and especially preferably 0.05 to 0.5 μm.

In the case of using a filler in a fibrous state, a length thereof is preferably 0.1 to 500 μm, and more preferably 1 to 20 μm. A diameter thereof is preferably 0.001 to 100 μm, more preferably 0.005 to 5 μm, still more preferably 0.01 to 1 μm, and especially preferably 0.05 to 0.5 μm.

As for the conductive filler, examples of the metal material include a metal particle, a metal fiber, an organic metal particle, an organic metal complex particle, a metal nanoparticle, a metal nanofiber, an organic metal nanopartide, and the like. As the carbon material, for example, at least one member selected from the group consisting of a graphite particle, a carbon particle, a carbon milled fiber, a carbon black, a carbon-nanotube, and a carbon-nanofiber containing a vapor grown carbon fiber (VGCF) is preferred.

As the carbon black, for example, furnace black, acetylene black, thermal black, channel black, ketjen black, and the like can be used, and a carbon black resulting from blending two or more kinds thereof is also suitably used.

As the conductive material as a continuous body, for example, a conductive material in a long fiber or film state can be used. Examples of the conductive material as a continuous body include a carbon long fiber, a metal long fiber, a graphite film, a metal foil, a carbon nanocoil, a metal nanowire, and the like.

In addition, as for a blending amount of the conductive material, it is preferred to blend the conductive material such that a rate of volume occupation in the conductive region is 20 to 95 volume %. An addition amount of the conductive material occupying in the whole of the prepreg is preferably 20 mass % or less, more preferably 10 mass % or less, still more preferably 5 mass % or less, and especially preferably 1 mass % or less. Although a lower limit, of the addition amount of the conductive material occupying in the whole of the prepreg is not particularly limited, from the viewpoint of conductivity of the obtained composite material, it is preferably 0.0005 mass % or more, and more preferably 0.001 mass % or more.

(4) Other Additives of Matrix Resin Composition:
[Curing Agent]

In the case of using a hardening resin as the matrix resin, a curing agent that cures the resin may be blended in the matrix resin composition, as the need arises. As the curing agent, a known curing agent that cures the matrix resin is used.

Examples of the curing agent that is used in the case of using an epoxy resin as the hardening resin include dicyandiamide, various isomers of aromatic amine-based curing agents, and aminobenzoic acid esters. The dicyandiamide is preferred because it is excellent in storage stability of the prepreg. In addition, aromatic diamine compounds, such as 4,4'-diaminodiphenylsulfone, 3,3'-diaminodiphenylsulfone, 4,4'-diaminodiphenylmethane, etc., and derivatives thereof having a nonreactive substituent are especially preferred from the viewpoint of providing a cured product having good heat resistance. Here, the nonreactive substituent is the same as the nonreactive substituent mentioned in the explanation of the epoxy resin.

As the aminobenzoic acid ester, trimethylene glycol di-p-aminobenzoate and neopentyl glycol di-p-aminobenzoate are preferably used. While the composite material resulting from curing using such a material is inferior in heat resistance to various isomers of the diaminodiphenylsulfone, it is excellent in tensile elongation. For that reason, the kind of the curing agent to be used is properly selected according to an application of the composite material.

As for an amount of the curing agent that is contained in the matrix resin composition, an amount suited for at least curing the matrix resin blended in the resin composition has only to be properly adjusted according to the kinds of the matrix resin and the curing agent to be used. As for the blending amount, the curing agent can be properly used in a desired blending amount taking into consideration the presence or absence and addition amount of a curing agent-curing promoter, an amount of chemical reaction with the hardening resin, a curing rate of the composition, and so on. From the viewpoint of storage stability, the curing agent is blended in an amount of 30 to 100 parts by mass, and more preferably 30 to 70 parts by mass based on 100 parts by mass of the matrix resin contained in the resin composition.

As the curing agent, it is also possible to use DDS microencapsulated with a coating agent (for example, DDS COAT10 (manufactured by Matsumoto Yushi-Seiyaku Co., Ltd.). In order to prevent a reaction with an uncured epoxy resin in a room temperature state from occurring, the microencapsulated DDS is one resulting from coating a surface layer of a DDS particle with a substance that is less in reactivity with the epoxy resin, specifically a coating agent, such as a polyamide, a modified urea resin, a modified melamine resin, a polyolefin, a polyparaffin (inclusive of modified products thereof), etc., through a physical or chemical bond. These coating agents may be used solely or in combination. In addition, DDS microencapsulated with a coating agent of every kind other than those described above can also be used.

[Thermoplastic Resin]

In the case of using a resin having a low viscosity as the matrix resin, in order to give an appropriate viscosity to the resin composition, a thermoplastic resin may also be blended. The thermoplastic resin that is blended in this resin composition for the purpose of adjusting the viscosity also has an effect for improving mechanical characteristics of the finally obtained fiber-reinforced composite material, such as impact resistance, etc.

An amount of the above-described thermoplastic resin that is blended in the matrix resin composition varies with the kind of the matrix resin used in the resin composition and may be properly adjusted such that the viscosity of the resin composition has an appropriate value as described later. In general, it is preferred to blend the thermoplastic resin in an amount of 5 to 100 parts by mass based on 100 parts by mass of the matrix resin contained in the resin composition.

The viscosity of the matrix resin composition is preferably 10 to 450 poises, and more preferably 50 to 400 poises in terms of a minimum viscosity at 80° C. In the case where the minimum viscosity of the resin composition is 10 poises or more, an effect for inhibiting outflow of the conductive material in the conductive region to localize the conductive material at a desired position of the prepreg becomes high. The viscosity refers to a viscosity obtained from a temperature-viscosity curve as measured using a rheometer. The viscosity of the matrix resin can be adjusted by the addition amount of the thermoplastic resin, particularly a matrix resin-soluble thermoplastic resin as described later.

Examples of the thermoplastic resin include a matrix resin-soluble thermoplastic resin and a matrix resin-insoluble thermoplastic resin. The matrix resin-soluble thermoplastic resin refers to a thermoplastic resin, a part or the whole of which may be dissolved in the matrix resin by heating or the like. Meanwhile, the matrix resin-insoluble thermoplastic resin refers to a thermoplastic resin which is not substantially dissolved in the matrix resin at a forming temperature of FRP or a lower temperature. That is, the matrix resin-insoluble thermoplastic resin refers to a thermoplastic resin in which on charging a resin particle in the matrix resin and then stirring, a size of the particle does not change at a temperature of forming FRP. In general, the temperature of forming FRP is 100 to 190° C.

In the case where the matrix resin-soluble thermoplastic resin is not completely dissolved, by heating in a curing process of the matrix resin composition, the matrix resin-soluble thermoplastic resin is dissolved in the matrix resin, thereby enabling the viscosity of the matrix resin composition to increase. According to this, a flow of the matrix resin composition to be caused due to a decrease of the viscosity in the curing process (phenomenon in which the resin composition flows out from the inside of the prepreg) can be prevented from occurring.

[Matrix Resin-Soluble Thermoplastic Resin]

The matrix resin-soluble thermoplastic resin is preferably a resin that is dissolved in the matrix resin to an extent of 80 mass % or more at the curing temperature of the matrix resin.

For example, in the case of using an epoxy resin as the matrix resin, specific examples of the matrix resin-soluble thermoplastic resin include a polyethersulfone, a polysulfone, a polyetherimide, a polycarbonate, and the like. These may be used solely or may be used in combination of two or more thereof. As the matrix resin-soluble thermoplastic resin that is contained in the matrix resin composition, a polyethersulfone and a polysulfone each having a weight average molecular weight (Mw) ranging from 8,000 to 40,000 are especially preferred. It is preferred that a molecular weight distribution of the matrix resin-soluble thermoplastic resin is uniform. In particular, a polydispersity (Mw/Mn) that is a ratio of a weight average molecular weight (Mw) to a number average molecular weight (Mn) is preferably in the range of 1 to 10, and more preferably in the range of 1.1 to 5.

It is preferred that the matrix resin-soluble thermoplastic resin has a reactive group having reactivity with the matrix resin or a functional group that forms a hydrogen bond. Such a matrix resin-soluble thermoplastic resin is able to improve dissolution stability during the curing process of the matrix resin. In addition, it is possible to impart toughness, chemical resistance, heat resistance, and resistance to moist neat to FRP obtained after curing.

For example, in the case of using an epoxy resin as the matrix resin, a hydroxyl group, a carboxyl group, an imino group, an amino group, and the like are preferred as the reactive group having reactivity with the matrix resin. Use of a hydroxyl group-terminated polyethersulfone is preferred because the obtained FRP is especially excellent in impact resistance, fracture toughness, and solvent resistance.

A content of the matrix resin-soluble thermoplastic resin that is contained in the matrix resin composition is properly adjusted according to the viscosity of the matrix resin. From, the viewpoint of processability of the prepreg, the content is preferably 5 to 100 parts by mass, more preferably 5 to 50 parts by mass, and still more preferably 10 to 40 parts by mass based on 100 parts by mass of the matrix resin.

Although a form of the matrix resin-soluble thermoplastic resin is not particularly limited, it is preferably in a granular state. The matrix resin-soluble thermoplastic resin in a granular state can be uniformly blended, in the resin composition. In addition, the formability of the obtained prepreg is high. An average particle diameter of the matrix resin-soluble thermoplastic resin is preferably 1 to 50 μm, and especially preferably 3 to 30 μm.

[Matrix Resin-Insoluble Thermoplastic Resin]

The matrix resin composition may contain, in addition to the matrix resin-soluble thermoplastic resin, a matrix resin-insoluble thermoplastic resin. In the present invention, it is preferred that the matrix resin composition contains both the matrix resin-soluble thermoplastic resin and the matrix resin-insoluble thermoplastic resin.

The matrix resin-insoluble thermoplastic resin and a part of the matrix resin-soluble thermoplastic resin (the epoxy resin-soluble thermoplastic resin remained without being dissolved in the matrix resin after curing) become in a state that a particle thereof is dispersed in the matrix resin of FRP (this dispersed particle will be hereinafter also referred to as "interlaminar particle"). This interlaminar particle inhibits propagation of the impact that FRP receives. As a result, the impact resistance of the obtained FRP is improved.

For example, in the case of using an epoxy resin as the matrix resin, examples of the matrix resin-insoluble thermoplastic resin include a polyamide, a polyacetal, a polyphenylene oxide, a polyphenylene sulfide, a polyester, a polyamide-imide, a polyimide, a polyether ketone, a polyetheretherketone, a polyethylene naphthalate, a polyether nitrile, and a polybenzimidazole. Of those, a polyamide, a polyamide-imide, and polyimide are preferred because they are high in toughness and heat resistance. A polyamide and a polyimide are especially excellent in a toughness improving effect against FRP. These may be used solely or may be used in combination of two or more thereof. In addition, a copolymer thereof can also be used.

In particular, by using an amorphous polyimide or a polyamide, such as Nylon 6 (registered trademark) (polyamide obtained through a ring-opening polycondensation reaction of caprolactam), nylon 12 (polyamide obtained through ring-opening polycondensation reaction of lauryl lactam), and amorphous nylon (a nylon also called a transparent nylon, in which crystallization of polymer does not occur, or a crystallization rate of polymer is extremely slow), the heat resistance of the obtained FRP can be especially improved.

A content of the matrix resin-insoluble thermoplastic resin in the matrix resin composition is properly adjusted according to the viscosity of the matrix resin composition. From, the viewpoint of processability of the prepreg, the content is preferably 5 to 60 parts by mass, and more preferably 15 to 40 parts by mass based on 100 parts by mass of the matrix resin. Preferred average particle diameter and form of the matrix resin-insoluble thermoplastic resin are the same as those in the matrix resin-soluble thermoplastic resin.

[Other Conductive Materials]

The matrix resin composition may contain a conductive material other than the conductive material existing in the conductive region, as the need arises. As the conductive material, the same conductive material as described above can be used. The conductive material is blended such that a blending amount thereof is preferably 0.0001 to 20 parts by mass, more preferably 0.0005 to 10 parts by mass, and especially preferably 0.01 to 5 parts by mass based on 100 parts by mass of the base resin contained in the matrix resin composition.

[Other Additives]

The matrix resin composition can properly contain, in addition to the above-described components, various additives, such as an acid anhydride, a Lewis acid, a basic curing agent, e.g., dicyandiamide (DICY) or an imidazole, a urea compound, an organic metal salt, a reaction diluent, a filler, an antioxidant, a flame retarder, a pigment, etc.

Specifically, examples of the acid anhydride include phthalic anhydride, trimellitic anhydride, pyromellitic anhydride, and the like. Examples of the Lewis acid include trifluoroborate salts, and in more detail, examples thereof include $BF_3$ monoethylamine, $BF_3$ benzylamine, and the like. Examples of the imidazole include 2-ethyl-4-methylimidazole, 2-ethylimidazole, 2,4-dimethylimidazole, and 2-phenylimidazole. In addition, there may be exemplified 3-[3,4-dichlorophenyl]-1,1-dimethylurea (DCMU), etc. as the urea compound, and Co[III] acetylacetonate, etc. as the organic metal salt. As the reaction diluent, there are exemplified reactive diluents, for example, polypropylene glycol diglycidyl ether, phenyl glycidyl ether, etc.

(5) Production Method of Matrix Resin Composition:

A production method of the matrix resin composition is not particularly limited, and any of conventionally known methods may be adopted. For example, in the case of using an epoxy resin as the matrix resin, a temperature ranging from 10 to 160° C. can be exemplified as a kneading temperature that is applied at the time of producing the resin composition. When the kneading temperature is higher than 160° C., there is a case where thermal degradation of the epoxy resin or a partial curing reaction starts, whereby storage stability of the obtained resin composition and the prepreg produced using the same is worsened. When the kneading temperature is lower than 10° C., there is a case where the viscosity of the epoxy resin composition is high, so that kneading becomes substantially difficult. The kneading temperature is in the range of preferably 20 to 130° C., and more preferably 30 to 110° C.

As a kneading machine apparatus, conventionally known ones can be used. Specific examples thereof include a roll mill, a planetary mixer, a kneader, an extruder, a Banbury mixer, a mixing vessel equipped with a stirring blade, a horizontal mixing tank, and the like. Kneading of the respective components can be performed in the air or in an inert gas atmosphere. In the case of performing kneading in the air, an atmosphere where the temperature or humidity is controlled is preferred. Although there is no limitation, for example, it is preferred to perform kneading at a temperature controlled at a fixed temperature of 30° C. or lower, or in a low-humidity atmosphere at a relative humidity of 50% RH or less.

(6) Prepreg:

The prepreg of the present invention is one in which the matrix resin composition is impregnated in gaps among the respective fiber base materials constituting the conductive fiber base material.

A content of the matrix resin composition is preferably 15 to 60 mass % on the basis of the whole mass of the prepreg. When the content is less than 15 mass %, there is a case where a vacant space or the like is generated in the obtained composite material, thereby worsening the mechanical characteristics. When the content is more than 60 mass %, there is a case where a reinforcing effect by the reinforcing fiber becomes insufficient, whereby the mechanical characteristics relative to the mass become substantially low. The content is preferably 20 to 50 mass %, and more preferably 25 to 50 mass %.

Here, in the case where the matrix resin is an epoxy resin, as for the content of the composition, a proportion calculated from an amount of mass variation caused when the prepreg is dipped in sulfuric acid and optionally heated, whereby the epoxy resin is decomposed to decrease the mass is determined as the content of the resin composition.

Specifically, the prepreg is cut out into a size of 100 mm×100 mm to produce a test specimen, and a weight thereof is measured. Subsequently, this test specimen of the prepreg is dipped or boiled in sulfuric acid to decompose and elute the resin component. Thereafter, the remaining fibers are filtered off, washed with sulfuric acid, and dried, and a mass of the dried fibers is measured. Finally, the content of the epoxy resin composition is calculated from the mass variation before and after the decomposition operation with sulfuric acid.

A form of the prepreg of the present invention is not particularly limited so long as it is a shape in which the matrix resin composition is impregnated in the conductive fiber base material; however, a prepreg comprising a conductive fiber layer composed of conductive fibers and a matrix resin composition impregnated in spaces among the above-described conductive fibers, and a resin layer covered on the surface of the above-described conductive fiber layer is preferred. A thickness of the resin layer is preferably 2 to 100 μm. The thickness of the resin layer is more preferably 5 to 50 μm, and especially preferably 10 to 40 μm.

(7) Production Method of Prepreg:

A production method of the prepreg is not particularly limited, and any of conventionally known methods may be adopted. Specifically, a hot-melt method and a solvent method can be suitably adopted.

The hot-melt method is a method in which the above-described matrix resin composition is applied in a thin film state on a release paper to form a resin composition film, subsequently, the formed film is released from the release paper to obtain a resin composition film, and thereafter, the resin composition film is laminated on a conductive fiber base material and heated under pressure, thereby impregnating the resin composition in the conductive fiber base material.

A method of forming the resin composition into a resin composition film is not particularly limited, and any of conventionally known methods can be adopted. Specifically, the resin composition film can be obtained by casting the resin composition on a support, such as a release paper, a film, etc., by utilizing a die extruder, an applicator, a reverse roll coater, comma coater, or the like. A resin temperature on producing the film is properly determined according to the composition or viscosity of the resin from which the film is produced. Specifically, the same temperature conditions as in the kneading temperature in the above-described production method of an epoxy resin composition are suitably adopted. The number of times of the impregnation is not limited to one time, but the impregnation may also be performed in a multistage manner at arbitrary pressure and temperature while being divided into plural times.

The solvent method is a method in which the resin composition is formed in a varnish state by using an appropriate solvent, and this varnish is impregnated in the conductive fiber base material. Of those conventional methods, in particular, the prepreg of the present invention can be suitably produced by the hot-melt method that is the conventionally known production method.

An impregnation pressure on impregnating the matrix resin composition in the conductive fiber base material using the resin composition film is properly determined taking into consideration the viscosity and resin flow, etc. of the resin composition.

In the case of using the epoxy resin as the matrix resin and impregnating the epoxy resin composition film in the conductive fiber base material by the hot-melt method, an impregnation temperature is preferably in the range of 50 to 150° C. The impregnation, temperature is more preferably 60 to 145° C., and especially preferably 70 to 140° C.

The prepreg of the present invention has a conductive region where the conductive material is dispersed in the resin. Such a prepreg of the present invention is obtained by a production method, of a prepreg including integrating the matrix resin composition and the conductive material with the base material composed of conductive fibers, the production method being a production method of a prepreg including localizing the conductive material in a part of the prepreg to form a conductive region where the conductive material is dispersed in the resin.

Although the forming method of such a conductive region is not particularly limited, examples thereof include a method in which the resin layer of the above-produced prepreg not having a conductive region or the whole of the prepreg is perforated using a laser or the like, and the conductive material is filled directly or as a conductive material paste dispersed in a dispersant; a method in which on producing a prepreg, the conductive region is formed in the resin film and transferred; a method in which particles resulting from dispersing the conductive material in the resin are added to the matrix resin composition before impregnation or onto the prepreg surface; and the like. Above all, a method in which on producing a prepreg, the conductive region is formed in the resin film and transferred is preferred.

As a more specific production method of the prepreg of the present invention, for example, there is exemplified a production method of a prepreg including laminating the resin film composed of the matrix resin composition on the conductive fiber base material and integrating the matrix resin composition with the conductive fiber base material, the production method being a production method of a prepreg, in which the above-described resin film is a conductive material-localized resin film in which the conductive material is localized in a part of the film composed of the matrix resin composition.

The conductive material-localized resin film is preferably a conductive material-localized resin film obtained by disposing the conductive material on a surface of the film, composed of the matrix resin and is also preferably a conductive material-localized resin film obtained by disposing the conductive material on the support and then transferring the conductive material onto the film composed of the matrix resin.

In addition, the prepreg of the present invention can also be produced by a production method of a prepreg including integrating the matrix resin composition with the conductive fiber base material, the production method being a production method of a prepreg, in which the conductive fiber base material is a conductive fiber base material in which the conductive material is localized on a part of the surface in advance.

In the case of disposing the conductive material on a sheet material, such as a rein film, a support, a conductive fiber base material, etc., only the conductive material may be disposed directly, or the conductive material may be disposed as a conductive material paste having the conductive material, dispersed in a dispersant, such as a resin, etc.

In the case of forming the conductive region in only the resin layer, a method in which the conductive material-localized resin film is used as the resin layer film that forms the resin layer for a primary prepreg resulting from impregnating a part of the matrix resin in the conductive fiber base material in advance; or a method in which the conductive material is disposed on a surface of a primary prepreg, and the resin film composed of the matrix resin that forms the resin layer is laminated on and impregnated with the primary prepreg is preferred.

Examples of the method, of forming the conductive region in the resin film, (method of producing the conductive material-localized resin film) include a method in which the conductive material is disposed directly on the support, such as a release paper, etc., or a conductive material paste having the conductive material dispersed in a dispersant, such as a resin, etc., is disposed on the support, and the matrix resin is then cast to form the resin film; a method in which the matrix resin is cast on the support to produce the resin film, and then, the conductive material is disposed directly, or the conductive material paste having the conductive material dispersed in the resin is disposed on such a film; a method in which the film having the conductive material or conductive material paste disposed on the surface thereof is stuck onto the resin film; a method in which the conductive material paste disposed on the support is transferred onto the resin film; and the like.

In the case of disposing the conductive material or conductive material paste on the resin film, the support, the film or the surface of the conductive fiber base material, the conductive material or conductive material paste may be disposed on such a film by a method, such as screen printing, inkjet printing, application by a dispenser, etc., or after perforating such a film, the conductive material or conductive material paste may be filled. It is preferred to dispose the conductive material or conductive material paste by a method, such as screen printing, inkjet printing, application by a dispenser, etc.

In the case of disposing the conductive material or conductive material paste on the resin film or support, a shape thereof may be properly determined according to the shape or size of the desired conductive region. Examples of a disposition pattern of the conductive material or conductive material paste include a continuous disposition, such as a linear state, a lattice state, etc., and a discontinuous disposition, such a dotted state, an island state, etc. In the case of a discontinuous disposition, the individual dots or islands may be disposed in a regular fashion, such as a lattice state, a zigzag state, a circular state, etc., or may be disposed randomly.

In the case where the conductive material or conductive material paste is continuously disposed, a width thereof is preferably 1 μm to 5 mm, and more preferably 10 μm to 1 mm in a bottom thereof. In the case where the conductive material or conductive material paste is discontinuously disposed, a shape of a bottom thereof is not particularly limited, and an arbitrary shape, such as a circle, an ellipse, a square, a polygon, a star shape, an indeterminate form, etc., can be adopted. In addition, a size thereof is preferably 0.1 μm to 5 mm, more preferably 1 μm to 1 mm, and still more preferably 10 to 500 μm in terms of a diameter of a circumcircle on the bottom. In addition, an area of the bottom is preferably 0.01 to 500,000 μm$^2$, more preferably 0.1 to 100,000 μm$^2$, and still more preferably 1 to 10,000 μm$^2$.

A height of the conductive material or conductive material paste to be disposed may be properly adjusted according to the thickness of the prepreg or resin layer and is preferably a thickness of 80% or more of the thickness of the resin layer. In the case where the conductive material or conductive material paste is disposed in such a manner that the conductive region pieces through the conductive fiber layer, the height is preferably a thickness of 90% or more of the thickness of the prepreg. In addition, the height of the conductive material or conductive material paste disposed is preferably 1 to 3,000 μm, and more preferably 10 to 300 μm. A three-dimensional shape of the conductive material or conductive material paste disposed is not particularly limited, and an arbitrary shape, such as a columnar shape, a prismatic shape, a conical shape, a pyramid shape, a hemispherical shape, a half-ellipsoid shape, etc., can be adopted. On forming the prepreg or fiber-reinforced composite material, a difference in contact area between the bottom and the upper fiber layer becomes small, and therefore, the shape is preferably a columnar shape, a prismatic shape, a hemispherical shape, or a half-ellipsoid shape. In the case where the conductive material or conductive material paste is continuously disposed, it is preferred to dispose the conductive material or conductive material paste in such a manner that a cross section in the width direction is a square shape, a trapezoidal shape, a circular shape, a semicircular shape, or a semi-elliptic shape.

In the case of using the conductive material as a conductive material paste thereof dispersed in a dispersant, a solvent or a resin can be used as the dispersant that disperses the conductive material therein. It is preferred to use a resin having compatibility with the matrix resin, and it is more preferred to use the same resin as the matrix resin. In the case of using the solvent, as the dispersant, it is preferred that after disposing the conductive material paste, the solvent is removed. In addition, in the case of using the resin as the dispersant, it is preferred to use a curable resin, such as a thermosetting resin, a UV curing resin, etc.

In addition, in a method of adding particles resulting from dispersing the conductive material in the resin to the matrix resin composition before impregnation or onto the prepreg surface, in the case of using a hardening resin as the resin that disperses the conductive material therein, or in the case of using a hardening resin as the dispersant of the conductive material paste, it is preferred to dispose the hardening resin in a semi-cured state (B-stage) in the prepreg. By forming the conductive region in the prepreg in a state where the conductive material is dispersed in the B-stage resin, it is possible to prevent diffusion of the conductive material into the inside of the resin layer in the surroundings of the conductive region from occurring, and therefore, the conductive region can be designed more precisely. Furthermore, on producing the fiber-reinforced composite material, the B-stage resin composition can be allowed to react with the surrounding matrix resin, and therefore, it is possible to form, a continuous phase where the resin in the conductive region is integrated with the matrix resin of the resin layer. In the case of sticking a film having the conductive material disposed therein to the resin film, though the film in which the conductive material is disposed is not particularly limited, it is preferably a film having a thickness of 1 to 50 μm, and more preferably a film having a thickness of 5 to 20 μm.

As for a material of the film, use of a polymer compound is preferred because on forming a prepreg to fabricate the fiber-reinforced composite material, the film components work as a toughness enhancer of the composite material, whereby physical properties of the obtained composite material are improved. In the present invention, the film is preferably a polymer film that is soluble in the matrix resin. When the polymer film, that is soluble in the matrix resin is used, the polymer compound which has formed the film works as a toughness enhancer of the matrix resin, thereby enabling the mechanical characteristics of the composite material to be improved. Furthermore, such a polymer film functions as a support of the conductive material in a production step of the prepreg, whereas in the prepreg and the fiber-reinforced composite material obtained by forming the prepreg, the film is dissolved in the matrix resin and vanishes, and therefore, the conductive region can be formed over the whole area in the thickness direction of the resin layer.

As the film that is soluble in the matrix resin, it is preferred to use a film obtained by forming a thermoplastic resin that is soluble in the above-described matrix resin in a film state. In the case of using an epoxy resin as the matrix resin, examples thereof include a polyetherimide film, a polyethersulfone film, a polysulfone film, a polycarbonate film, and the like.

In the case of disposing the conductive material by transfer, though the support for transfer is not particularly limited, the support is preferably a planar body having release properties, such as a release paper containing a release agent, such as a silicone-based release agent, etc., a release film, such as a fluorine resin film, etc., or the like.

The prepreg obtained by adopting the above-described method is laminated, formed, and cured according to the object, thereby producing the fiber-reinforced composite material. This production method itself is known. In accordance with the prepreg of the present invention, a carbon fiber-reinforced composite material having both excellent conductivity and mechanical characteristics can be obtained.

The fiber-reinforced composite material of the present invention can be produced by a conventionally known method by laminating, forming, and curing the prepreg of the present invention according to the object. As the production method of a fiber-reinforced composite material, for example, a method of using manual lay-up, automated tape lay-up (ATL), automated fiber placement, vacuum bagging, autoclave curing, curing other than autoclave, fluid assisted process, pressure assisted process, match mold process, simple press curing, press clave curing, or continuous band press is applied.

Since the fiber-reinforced composite material of the present invention has both, excellent conductivity and mechanical characteristics, it is applicable to a lot of applications requiring improvements in electromagnetic shielding, electrostatic protection, current return, and conductivity. In particular, the fiber-reinforced composite material of the present invention is able to be used for the purpose of solving various electromagnetic problems in aerospace parts, wind turbines, pressure vessels, buildings, ships, trains, automobiles, fuel tanks, and other fields.

EXAMPLES

The present invention is hereunder more specifically described by reference to Examples, but it should not be construed that the present, invention is limited to the Examples. Components and testing methods used in the present Examples and Comparative Examples are described below.

[Component]

(Conductive Fiber Base Material)

A conductive fiber base material (fiber areal weight: 190 g/m$^2$) resulting from arranging carbon fiber strands in parallel in one direction was used as a conductive fiber base material. Tensile strength and modulus of the carbon fiber strands used (Tenax IMS60 (trade name)), manufactured by Toho Tenax Co., Ltd. were as follows.

Tensile strength: 5,800 MPa

Modulus: 290 GPa

[Epoxy Resin Composition]

(Epoxy Resin)

Glycidylamine type epoxy resin (trifunctional group) [Araldite MY0600 (trade name), manufactured by Huntsman Advanced Materials] (MY0600)

Glycidylamine type epoxy resin (tetrafunctional group) [Araldite MY721 (trade name), manufactured by Huntsman Advanced Materials] (MY721)

(Epoxy Resin Curing Agent)

4,4'-Diaminodiphenyl sulfone [aromatic amine-based curing agent, manufactured by Wakayama Seika Kogyo Co., Ltd.] (4,4'-DDS)

(Thermoplastic Resin)

Thermoplastic Resin A:

Polyethersulfone having an average particle diameter of 20 μm [PES-5003P (trade name), manufactured by Sumitomo Chemical Co., Ltd.] (epoxy resin-soluble thermoplastic resin)

Thermoplastic Resin B:

Grilamid having an average particle diameter of 20 μm [TR-55 (tradename), manufactured by EMS-CHEMIE (Japan) Ltd.] (epoxy resin-insoluble thermoplastic resin)

[Conductive Material]

(Conductive Material)

Silver nanoparticle (average particle diameter: 20 nm (catalogue value)) [manufactured by DOWA Electronics Materials Co., Ltd.]

Carbon black (primary particle diameter: 39.5 nm (catalogue value)) [Ketjen Black EC300J (trade name), manufactured by Lion Corporation]

(Conductive Material Paste)

Silver Paste 1:

To 100 parts by mass of "Araldite (registered trademark)" MY0600 serving as an epoxy resin, 20 parts by mass of 4,4'-diaminodiphenylsulfone (4,4'-DDS) serving as a curing agent and 100 parts by weight of the above-described silver nanoparticle were added, thereby forming a conductive material paste 1 having the silver nanoparticle dispersed in the epoxy resin.

Silver Paste 2:

Conductive adhesive for electronics, manufactured by Sanyu Rec Co., Ltd., GA-6278 (trade name)

(Conductive material: silver fine particle (average particle diameter: 2 μm), dispersant: epoxy resin, electrical resistivity (volume resistivity): $5 \times 10^{-4}$ Ω·cm, weight content of conductive material: 75 wt %, volume content of conductive material: 26 vol %)

Silver Paste 3:

Highly conductive silver nanoparticle paste, MDot EC264 (trade name), manufactured by Mitsuboshi Belting Ltd.

(Conductive material: silver nanoparticle (average particle diameter: 0.2 μm), dispersant: thermosetting resin, electrical resistivity (volume resistivity): $8 \times 10^{-6}$ Ω·cm, weight content of conductive material: 80 wt %, volume content of conductive material: 32 vol %)

Silver Paste 4:

Hybrid nano silver paste, TEC-PA-010 (trade name), manufactured by InkTec Co., Ltd.

(Conductive material: silver complex (average particle diameter: 35 nm), electrical resistivity (volume resistivity): $8 \times 10^{-6}$ Ω·cm Silver Paste 5:

Metal nano particle ink, AGK101 (trade name), manufactured by Kishu Giken Kogyo Co., Ltd.

(Conductive material: silver nanoparticle (average particle diameter: 20 nm), electrical resistivity (volume resistivity): $5.0 \times 10^{-3}$ Ω·cm, weight content of conductive material: 35 wt %)

Silver Paste 6:

Silver paste for UV curing, UV700-SR1J (trade name), manufactured by Tanaka Kikinzoku Kogyo K.K.

(Conductive material: silver, dispersant: UV curing resin, electrical resistivity (volume resistivity): $6 \times 10^{-4}$ Ω·cm, weight content of conductive material: 86 wt %, volume content of conductive material: 34 vol %)

Silver Paste 7:

Silver paste, RA FS 110S (trade name), manufactured by Toyochem Co., Ltd.

(Conductive material: silver fine particle (average particle diameter: 4 μm), electrical resistivity (volume resistivity): $5 \times 10^{-5}$ Ω·cm, weight, content of conductive material: 82 wt %, volume content of conductive material: 33 vol %)

Copper Paste:

Conductive copper paste, ACP-100 (trade name), manufactured by Asahi Chemical Research Laboratory Co., Ltd.

(Conductive material: copper, electrical resistivity (volume resistivity): $1.6 \times 10^{-4}$ Ω·cm)

Nickel Paste:

Conductive adhesive, ECA202 (trade name), manufactured by Nihon Handa Co., Ltd.

(Conductive material: nickel, dispersant: epoxy resin, electrical resistivity (volume resistivity): $2.0 \times 10^{-1}$ Ω·cm)

Carbon Paste:

Conductive paste, DY-280H-3 (trade name), manufactured by Toyobo Co., Ltd.

(Conductive material: carbon, dispersant: thermosetting resin, electrical resistivity: $8.0 \times 10^{-2}$ Ω·cm)

[Support]

Fluorine-based release film (FEP film) [A4000R Red Release Film, (trade name), manufactured by Airtec Japan Co., Ltd.]

Silicone-based release paper [silicone-based release paper, WBF90K-D (trade name), manufactured by Lintec Corporation] (release paper)

[Measurement Method]

(1) Average Particle Diameter:

The average particle diameter of the conductive material contained in the conductive material paste was measured in the following manner. That is, the conductive material paste was diluted with an organic solvent; thereafter, particles were enlarged to 10,000 times by a scanning electron microscope and photographed; 30 particles were selected at random and measured for a particle diameter thereof; and an average value thereof was determined.

(2) Measurement of Volume Resistivity in Z-Direction:

In the present invention, the conductivity of the composite material was evaluated in terms of a volume resistivity in the Z-direction (thickness direction). The volume resistivity is a specific resistance of the given material. A unit of the measurement of conductivity of the three-dimensional material is ohm-cm (Ω·cm). A volume resistivity ρ of the material in the Z-direction is generally defined according to the following equation.

$$\rho = RA/L$$

R: Electrical resistivity of test specimen (measured by digital ohm meter)

L: Thickness of test specimen (m)

A: Cross-sectional area of test specimen (m²)

In the present invention, the volume resistivity is measured only in the Z-direction (thickness direction of the composite material). In the calculation, since the thickness is always taken into consideration, in all cases, this value is a "volume" resistivity.

(Production Method of Sample for Volume Resistivity Measurement in the Z-Direction)

The prepreg was cut and laminated to obtain a laminate having a laminated construction $[+45/0/-45/90]_{2S}$. The laminate was formed under a pressure of 0.49 MPa at 180° C. for 120 minutes by a vacuum autoclave forming method. The obtained formed product was cut in a size of 40 mm in width×40 mm in length, and the surface of the formed product was polished with, a sand paper until the carbon fiber was exposed. Finally, surface finishing was performed using a #2000 sand paper, thereby obtaining a test specimen.

The obtained test specimen was sandwiched between two electrodes of 50 mm in width×50 mm in length which had been subjected to gold plating.

The resistivity value of the test specimen in the Z-direction was measured with a digital ohm meter (AX-114N, manufactured by Adex Aile Co., Ltd.) in a state in which a load of 0.06 MPa was applied between both electrodes, and the volume resistivity was determined according to the above-described equation. The resistivity value was measured with respect to 10 sheets of the test specimen, and the volume resistivity was calculated and evaluated using an average value thereof.

(3) Interlaminar Toughness of Fiber-Reinforced Composite Material (Mode I Interlaminar Toughness (GIc))

The interlaminar toughness of the fiber-reinforced composite material was measured in an interlaminar toughness mode I (GIc) in conformity with JIS K7086 and evaluated. The obtained prepreg was cut in a regular square having a side of 360 mm and laminated, thereby producing two laminates having 10 layers in the 0° direction. In order to generate an initial crack, a release sheet was sandwiched between the two laminates, and the both were combined to obtain a prepreg laminate having a laminated construction $[0]_{20}$. The prepreg laminate was formed under a pressure of 0.59 MPa under a temperature condition individually set for each of the Examples and Comparative Examples by adopting a usual vacuum autoclave forming method. The obtained formed product was cut into dimensions of 20 mm in width×195 mm in length, thereby obtaining a test specimen of an interlaminar fracture toughness mode I (GIc).

By using a test method for double cantilever beam interlaminar fracture toughness (DCB method) as the testing method of the GIc, a pre-crack (initial crack) of 2 to 5 mm was allowed to be generated from the tip of the release sheet, and then, a test for promoting the cracking was further performed. A crosshead speed of a test specimen tensile testing machine was set to 0.5 mm/min until the promoted cracking reached 20 mm and to 1 mm/min after the promoted cracking reached 20 mm, and the measurement was performed with n=5. The GIc was calculated from a load, a displacement, and a crack length.

Example 1

To 100 parts by mass of "Araldite (registered trademark)" MY0600 serving as an epoxy resin, 20 parts by mass of 4,4'-diaminodiphenylsulfone (4,4'-DDS) serving as a curing agent and 100 parts by weight of the silver nanoparticle were added, thereby producing a conductive material paste 1 having the silver nanoparticle dispersed in the epoxy resin. Subsequently, on one surface of a PES film, the conductive material paste was subjected to screen printing in a columnar shape having a diameter of 30 μm and a height of 20 μm at intervals of 0.2 mm lengthwise and breadth wise, followed by heating at 120° C. for 5 minutes. The conductive material paste became in a gel state on the PES film, thereby keeping the shape after printing.

In a kneading apparatus, 10 parts by mass of the polyethersulfone 5003P (thermoplastic resin A) serving as a soluble thermoplastic resin was added to 50 parts by mass of MY0600 and 50 parts by mass of MY721 each serving as an epoxy resin, and the contents were stirred, with a stirrer at 120° C. for 30 minutes, thereby completely dissolving the thermoplastic resin A to prepare an epoxy resin composition. An electrical resistivity value of a resin resulting from curing such an epoxy resin composition was more than a measurement limit of a digital ohm meter (AX-114N, manufactured by Adex Aile Co., Ltd.) and unmeasurable, and its volume resistivity was more than $10^5$ Ωcm. Subsequently, the prepared epoxy resin composition was applied on a release film by using a film coater, thereby obtaining a resin film for surface layer (resin weight per unit: 10 g/m²). Onto a surface of the obtained resin film for surface layer, the PES film resulting from screen printing of the conductive material paste was stuck such that the printed surface came into contact with the epoxy resin composition.

Subsequently, 10 parts by mass of the thermoplastic resin A was newly added to 50 parts by mass of MY600 and 50 parts by mass of MY721, and the contents were stirred with a stirrer at 120° C. for 30 minutes to completely dissolve the thermoplastic resin A, followed by cooling to a resin temperature of 80° C. or lower. Thereafter, 30 parts by mass of the thermoplastic resin B was kneaded, and 45 parts by mass of 4,4'-DDS was further kneaded, thereby preparing an epoxy resin composition. An electrical resistivity value of a resin resulting from curing such an epoxy resin composition was more than a measurement limit of a digital ohm meter, too and unmeasurable, and its volume resistivity was more than $10^5$ Ωcm. The prepared resin composition was applied, on a release paper by using a film coater, thereby producing a resin film for impregnation of 40 g/m².

Onto both surfaces of the conductive fiber base material, the resin film for impregnation was stuck, and the resin composition was impregnated in the conductive fiber base material by a hot-melt method, thereby producing a primary prepreg. Subsequently, onto both surfaces of the conductive fiber base material having the resin impregnated therein (primary prepreg), the resin film for surface layer onto which the PES film had been stuck was stuck such that the PES film came into contact with the conductive fiber base material, thereby producing a prepreg. Using the produced prepreg, a volume resistivity measuring sample was formed by the above-described method, and the conductivity of the fiber-reinforced composite material was evaluated.

An electrical resistivity of the obtained fiber-reinforced composite material showed 180 Ω·cm. As a result of observing a cross section of the fiber-reinforced composite material with an electron microscope, the PES film was dissolved and vanished, and a region where the silver nanoparticle dispersed in the matrix resin was localized and existed in a high density in each of the interlaminar resin layers of the carbon fiber layer traversed in the thickness direction of the resin layer and existed coming into contact with the carbon fiber layer. In addition, the matrix resin in the region containing the silver nanoparticle in a high density was integrated with a matrix resin in other region to form a continuous phase.

Example 2

In a kneading apparatus, 40 parts by mass of the thermoplastic resin A was added to 50 parts by mass of MY0600 and 50 parts by mass of MY721 each serving as an epoxy resin, and the contents were stirred with a stirrer at 120° C. for 30 minutes, thereby completely dissolving the thermoplastic resin A to prepare an epoxy resin composition. Subsequently, the prepared epoxy resin composition was applied on a release film by using a film coater, thereby obtaining a resin film for surface layer (resin weight per unit: 10 g/m²). The obtained resin film for surface layer was subjected to screen printing on the film surface with a conductive material paste produced in the same method as in Example 1 at intervals of 3 mm in a linear state having a width of 30 µm and a thickness of 20 µm in the width direction of the film (direction perpendicular to the length direction).

Subsequently, 20 parts by mass of the thermoplastic resin A was newly added to 50 parts by mass of MY600 and 50 parts by mass of MY721, and the contents were stirred with a stirrer at 120° C. for 30 minutes to completely dissolve the thermoplastic resin A, followed by cooling to a resin temperature of 80° C. or lower. Thereafter, 30 parts by mass of the thermoplastic resin B was kneaded, and 45 parts by mass of 4,4'-DDS was further kneaded, thereby preparing an epoxy resin composition. The prepared resin composition was applied on a release paper by using a film coater, thereby producing a resin film for impregnation of 40 g/m$^2$.

Onto both surfaces of the conductive fiber base material, the resin film for impregnation was stuck, and the resin composition was impregnated in the conductive fiber base material by a hot-melt method, thereby producing a primary prepreg. Subsequently, onto both surfaces of the conductive fiber base material having the resin impregnated therein (primary prepreg), the resin film for surface layer was stuck such that the surface on which the conductive material paste had been printed came into contact with the conductive fiber base material, thereby producing a prepreg. Using the produced prepreg, a volume resistivity measuring sample was formed by the above-described method, and the conductivity of the fiber-reinforced composite material was evaluated.

The obtained fiber-reinforced composite material exhibited good conductivity. As a result of observing a cross section of the fiber-reinforced composite material with an electron microscope, a region where the silver nanoparticle dispersed in the matrix resin was localized and existed in a high density in each of the interlaminar resin layers of the carbon fiber layer traversed in the thickness direction of the resin layer and existed coming into contact with the carbon fiber layer. In, addition, the matrix resin in the region containing the silver nanoparticle in a high density was integrated with a matrix resin in other region to form a continuous phase.

Example 3

A screen printing plate in which dots (circles) having a diameter of 200 µm were disposed in a lattice state at intervals of 5 mm in the width direction and the length direction, respectively was prepared. The silver paste 2 was printed on an FEP film using a vacuum printing machine, VPES-HAIV, manufactured by Sanyu Rec Co., Ltd. A pressure at the time of printing was 100 kPa, and a clearance was 1 mm. After printing, the resultant was dried at 120° C. for 120 minutes. A shape of the conductive material paste after printing was in a hemispherical shape having a diameter of 140 µm and a height of 40 µm.

Subsequently, a resin film for surface layer (resin weight per unit: 10 g/m$^2$, resin thickness: 40 µm) was obtained in the same manner as in Example 1. Onto a surface of the obtained resin film for surface layer, the FEP film resulting from screen printing of the conductive material paste was stuck such that the printed surface came into contact with the epoxy resin composition. Thereafter, the FEP film was peeled off, thereby transferring the conductive material paste onto the resin film for surface layer. The conductive material paste after transfer kept the hemispherical shape.

Subsequently, a primary prepreg was produced in the same mariner as in Example 1. Onto both surfaces of the obtained primary prepreg, the resin film for surface layer onto which the conductive material paste had been transferred was stuck such that the conductive material paste came into contact with the conductive fiber base material, thereby producing a prepreg. A blending amount of the conductive material in this prepreg as calculated from the shape of the conductive material paste was 0.033 wt % relative to the weight of the matrix resin and 0.011 vol % relative to the volume of the matrix resin, respectively.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the matrix resin in the region containing the conductive material in a high density was integrated with a matrix resin in other region to form, a continuous phase.

Example 4

A prepreg was obtained in the same manner as in Example 3, except that the copper paste was used as the conductive material paste. A shape of the conductive material paste in the FEP film state after screen printing was in a hemispherical shape having a diameter of 130 µm and a height of 30 µm. In addition, a blending amount of the conductive material was 0.022 wt % relative to the matrix resin in the obtained prepreg.

A volume resistivity measuring sample was formed using the produced prepreg, and the conductivity of the fiber-reinforced composite material was evaluated. An electrical resistivity of the obtained fiber-reinforced composite material showed 250 Ω·cm.

As a result, of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 5

A prepreg was obtained in the same manner as in Example 3, except that the copper paste was used as the conductive material paste; and that the drying treatment after screen printing was changed to one at 130° C. for 30 minutes. A shape of the conductive material paste after screen printing was in a hemispherical shape having a diameter of 130 µm and a height of 40 µm. In addition, a blending amount of the conductive material was 0.018 wt % relative to the matrix resin in the prepreg.

A volume resistivity measuring sample was formed using the produced prepreg, and the conductivity of the fiber-reinforced composite material was evaluated. An electrical resistivity of the obtained fiber-reinforced composite material showed 800 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 6

A prepreg was obtained in the same manner as in Example 3, except that the nickel paste was used as the conductive material paste; and that the drying treatment after screen printing was changed to one at 120° C. for 60 minutes. A shape of the conductive material paste after screen printing was in a hemispherical shape having a diameter of 130 μm and a height of 40 μm. A blending amount, of the conductive material was 0.019 wt % relative to the matrix resin in the prepreg.

A volume resistivity measuring sample was formed using the produced prepreg, and the conductivity of the fiber-reinforced composite material was evaluated. An electrical resistivity of the obtained fiber-reinforced composite material showed 900 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 7

A prepreg was obtained in the same manner as in Example 3, except that the silver paste 3 was used as the conductive material paste; and that the drying treatment after screen printing was changed to one at 120° C. for 30 minutes. A shape of the conductive material paste after screen printing was in a hemispherical shape having a diameter of 170 μm and a height of 30 μm. In addition, a blending amount of the conductive material was 0.046 wt % relative to the matrix resin in the prepreg, and a volume ratio thereof was 0.013 vol %.

A volume resistivity measuring sample was formed using the produced prepreg, and the conductivity of the fiber-reinforced composite material was evaluated. An electrical resistivity of the obtained fiber-reinforced composite material showed 190 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 8

A prepreg was obtained in the same manner as in Example 3, except that the silver paste 4 was used as the conductive material paste; and that the drying treatment after screen printing was changed to one at 150° C. for 30 minutes. A shape of the conductive material paste after screen printing was in a hemispherical shape having a diameter of 180 μm and a height of 15 μm. In addition, a blending amount of the conductive material was 0.008 wt % relative to the matrix resin in the prepreg.

A volume resistivity measuring sample was formed using the produced prepreg, and the conductivity of the fiber-reinforced composite material was evaluated. An electrical resistivity of the obtained fiber-reinforced composite material showed 550 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin, layer and existed coming into contact with the carbon, fiber layer. In addition, the resin in the region containing the conductive material in a high density was integrated with a matrix resin in other region to form a continuous phase.

Example 9

On an FEP film, a conductive material paste was disposed in a lattice state of dots (circles) having a diameter of 200 μm at intervals of 5 mm in the width direction and the length direction, respectively by using a non-contact jet dispenser, Aero Jet, manufactured by Musashi Engineering, Inc., and the conductive material paste was then dried at 120° C. for 120 minutes. The silver paste 2 was used as the conductive material paste. A shape of the conductive material paste after drying was in a hemispherical shape having a diameter of 140 μm and a height of 50 μm.

Subsequently, a resin film for surface layer (resin weight per unit: 10 g/m$^2$) was obtained in the same manner as in Example 1. Onto a surface of the obtained resin film for surface layer, the FEP film resulting from screen printing of the conductive material paste was stuck such that the printed surface came into contact with the epoxy resin composition. Thereafter, the FEP film was peeled off, thereby transferring the conductive material paste onto the resin film for surface layer. The conductive material paste after transfer kept the hemispherical shape.

Subsequently, a primary prepreg was produced in the same manner as in Example 1. Onto both surfaces of the obtained primary prepreg, the resin film for surface layer onto which the conductive material paste had been transferred was stuck such that the conductive material paste came into contact with the conductive fiber base material, thereby producing a prepreg. A blending amount of the conductive material was 0.041 wt % relative to the matrix resin in the prepreg, and a volume ratio thereof was 0.014 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 10

On an FEP film, a conductive material paste was disposed in a lattice state of dots (circles) having a diameter of 200 μm at intervals of 5 mm in the width direction and the length direction, respectively by using an inkjet printer for PE, manufactured by Kishu Giken Kogyo Co., Ltd., and the conductive material paste was then dried under a condition at 180° C. for 30 minutes. The silver paste 5 was used as the conductive material paste. A shape of the conductive material paste after drying was in a hemispherical shape having a diameter of 150 μm and a height of 70 μm. However, after drying, the shape became a truncated cone shape in which a center thereof was depressed.

Subsequently, a resin film for surface layer (resin weight per unit: 10 g/m$^2$) was obtained in the same manner as in Example 1. Onto a surface of the obtained resin film for surface layer, the FEP film resulting from screen printing of the conductive material paste was stuck such that the printed surface came into contact with the epoxy resin composition. Thereafter, the FEP film was peeled off, thereby transferring the conductive material paste onto the resin film for surface layer. The conductive material paste after transfer kept the hemispherical shape.

Subsequently, a primary prepreg was produced in the same manner as in Example 1. Onto both surfaces of the obtained primary prepreg, the resin film for surface layer onto which the conductive material paste had been transferred was stuck such that the conductive material paste came into contact with the conductive fiber base material, thereby producing a prepreg. A blending amount of the conductive material was 0.015 wt % relative to the matrix resin in the prepreg.

A volume resistivity measuring sample was formed using the produced prepreg, and the conductivity of the fiber-reinforced composite material was evaluated. An electrical resistivity of the obtained fiber-reinforced composite material showed 300 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 11

A primary prepreg was produced in the same method as in Example 1. The silver paste 2 was printed on one surface of the primary prepreg by using a screen printing plate in which dots (circles) having a diameter of 200 μm were disposed in a lattice state at intervals of 5 mm in the width direction and the length, direction, respectively and a vacuum printing machine, VPES-HAIV, manufactured by Sanyu Rec Co., Ltd. A pressure at the time of printing was 100 kPa, and a clearance was 1 mm. After printing, the resultant, was dried at 50° C. for 180 minutes. The conductive material paste was dried on the primary prepreg to keep the dot shape. A shape of the conductive material paste after application was in a hemispherical shape having a diameter of 150 μm and a height of 35 μm.

Subsequently, a resin film for surface layer (resin weight per unit: 10 g/m$^2$) was obtained in the same manner as in Example 1. Onto a surface of the primary prepreg resulting from screen printing of the conductive material paste, the resin film for surface layer was stuck such that the printed surface of the primary prepreg came into contact with the epoxy resin composition of the resin film for surface layer, thereby producing a secondary prepreg. A blending amount of the conductive material was 0.033 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 190 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 12

A primary prepreg was produced in the same method as in Example 1. On one surface of the primary prepreg, a conductive material paste was disposed in a lattice state of dots (circles) having a diameter of 200 μm at intervals of 5 mm in the width direction and the length direction, respectively by using a non-contact jet dispenser, Aero Jet, manufactured by Musashi Engineering, Inc., followed by drying at 50° C. for 180 minutes. The silver paste 2 was used as the conductive material paste. The conductive material paste was dried on the primary prepreg to keep the dot shape. A shape of the conductive material paste after application was in a hemispherical shape having a diameter of 160 μm and a height of 50 μm. Thereafter, a prepreg was produced in the same method as in Example 11. A blending amount of the conductive material was 0.055 wt % relative to the matrix resin in the prepreg, and a volume ratio thereof was 0.019 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the inter laminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 13

A resin film for surface layer (resin weight per unit: 10 g/m$^2$) was obtained in the same manner as in Example 1.

Subsequently, on the resin film for surface layer, the conductive material paste 3 was disposed in a lattice state of dots (circles) having a diameter of 200 µm at intervals of 5 mm in the width direction and the length direction, respectively by using a non-contact jet dispenser, Aero Jet, manufactured by Musashi Engineering, Inc., followed by drying at 50° C. for 180 minutes. The conductive material paste was dried on the resin film for surface layer to keep the dot shape. A shape of the conductive material paste after application was in a hemispherical shape having a diameter of 190 µm and a height of 50 µm.

Subsequently, a primary prepreg was produced in the same manner as in Example 1. The primary prepreg and the resin film for surface layer having the conductive material paste applied thereonto were stuck such that the conductive material-applied surface of the resin film for surface layer came into contact with the epoxy resin composition of the primary prepreg, thereby producing a prepreg. A blending amount of the conductive material was 0.078 wt % relative to the matrix resin in the prepreg, and a volume ratio thereof was 0.026 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated, with a matrix resin in other region to form a continuous phase.

Example 14

A prepreg was produced in the same manner as in Example 3, except that the support was changed from the FEP film to a release paper. A shape of the conductive material paste after screen printing was in a hemispherical shape having a diameter of 160 µm find a height of 30 µm. In addition, a blending amount of the conductive material was 0.033 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 220 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 15

A prepreg was obtained in the same manner as in Example 3, except that the silver paste 6 was used as the conductive material paste; and that the drying treatment of the conductive material paste after screen printing was changed from the heating treatment at 120° C. for 120 minutes to irradiation with UV at normal temperature for 60 minutes. A shape of the conductive material paste after screen printing was in a hemispherical shape having a diameter of 160 µm and a height of 45 µm. In addition, a blending amount of the conductive material was 0.056 wt % relative to the matrix resin in the prepreg, and a volume ratio thereof was 0.017 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 16

A prepreg was obtained in the same manner as in Example 3, except that the screen printing plate was changed to a screen printing plate in which dots (circles) having a diameter of 200 µm were disposed in a zigzag state at intervals of 5 mm. A shape of the conductive material paste after screen printing was in a hemispherical shape having a diameter of 140 µm and a height of 40 µm. In addition, a blending amount of the conductive material was 0.033 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin, was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 17

A prepreg was obtained in the same manner as in Example 3, except that the screen printing plate was changed to a screen printing plate in which dots (circles) having a diameter of 200 µm were disposed in an oblique lattice state at intervals of 5 mm in the width direction and the length direction, respectively such that the dots arranged in the width direction were dislocated by 0.2 mm in every line in the width direction. A shape of the conductive material paste after screen printing was in a hemispherical shape having a diameter of 140 µm and a height of 40 µm. In addition, a blending amount, of the conductive material was 0.033 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 18

A prepreg was obtained in the same manner as in Example 3, except that the screen printing plate was changed to a screen printing plate in which dots (circles) having a diameter of 200 μm were disposed in a lattice state at intervals of 2.5 mm in the width direction and 10 mm in the length direction, respectively. A shape of the conductive material paste after screen printing was in a hemispherical shape having a diameter of 140 μm and a height of 40 μm. In addition, a blending amount of the conductive material was 0.033 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 19

A prepreg was obtained in the same manner as in Example 3, except that the screen printing plate was changed to a screen printing plate in which elliptic dots having a major axis of 300 μm and a minor axis of 100 μm were disposed in a lattice state at intervals of 5 mm in the width direction and the length direction, respectively. A shape of the conductive material paste after screen printing was in a half-ellipsoid shape having a major axis of 170 μm, a minor axis of 95 μm, and a height of 35 μm. In addition, a blending amount of the conductive material was 0.043 wt % relative to the matrix resin in the prepreg, and a volume ratio thereof was 0.015 vol %.

A volume resistivity measuring sample was formed using the produced prepreg, and the conductivity of the fiber-reinforced composite material was evaluated. An electrical resistivity of the obtained fiber-reinforced composite material showed 220 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 20

A prepreg was obtained in the same manner as in Example 3, except that the screen printing plate was changed to a screen printing plate in which straight lines having a width of 200 μm and extending in the width direction were disposed at intervals of 5 mm in the length direction. A shape of the conductive material paste after screen printing was in a line shape having a width of 180 μm and a height of 30 μm. In addition, a blending amount of the conductive material was 0.219 wt % relative to the matrix resin in the prepreg, and a volume ratio thereof was 0.074 vol %.

A volume resistivity measuring sample was formed using the produced prepreg, and the conductivity of the fiber-reinforced composite material was evaluated. An electrical resistivity of the obtained fiber-reinforced composite material showed 200 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 21

A prepreg was obtained in the same manner as in Example 3, except that the screen printing plate was changed to a screen printing plate in which dots (circles) having a diameter of 100 μm were disposed in a lattice state at intervals of 5 mm in the width direction and the length direction, respectively. A shape of the conductive material paste after screen printing was in a hemispherical shape having a diameter of 94 μm and a height of 17 μm. In addition, a blending amount of the conductive material was 0.007 wt % relative to the matrix resin in the prepreg, and a volume ratio thereof was 0.002 vol %.

A volume resistivity measuring sample was formed using the produced prepreg, and the conductivity of the fiber-reinforced composite material was evaluated. An electrical resistivity of the obtained fiber-reinforced composite material showed 600 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 22

A prepreg was obtained in the same manner as in Example 3, except that the screen printing plate was changed to a screen printing plate in which dots (circles) having a diameter of 150 μm were disposed in a lattice state at intervals of 5 mm in the width direction and the length direction, respectively. A shape of the conductive material paste after screen printing was in a hemispherical shape having a diameter of 108 μm and a height of 26 μm. In addition, a blending amount of the conductive material was 0.013 wt % relative to the matrix resin in the prepreg, and a volume ratio thereof was 0.004 vol %.

A volume resistivity measuring sample was formed using the produced prepreg, and the conductivity of the fiber-reinforced composite material was evaluated. An electrical resistivity of the obtained fiber-reinforced composite material showed 350 Ω·cm.

As a result of observing a cross section of the fiber-re info reed composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 23

A prepreg was obtained in the same manner as in Example 3, except that the screen printing plate was changed to a screen printing plate in which dots (circles) having a diameter of 300 μm were disposed in a lattice state at intervals of 5 mm in the width direction and the length direction, respectively. A shape of the conductive material paste after screen printing was in a hemispherical shape having a diameter of 168 μm and a height of 58 μm. In addition, a blending amount of the conductive material was 0.071 wt % relative to the matrix resin in the prepreg, and a volume ratio thereof was 0.024 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 24

A prepreg was obtained in the same manner as in Example 3, except that the screen printing plate was changed to a screen printing plate in which dots (circles) having a diameter of 500 μm were disposed in a lattice state at intervals of 5 mm in the width direction and the length direction, respectively. A shape of the conductive material paste after screen printing was in a hemispherical shape having a diameter of 246 μm and a height of 100 μm. In addition, a blending amount of the conductive material was 0.26 wt % relative to the matrix resin in the prepreg, and a volume ratio thereof was 0.088 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 25

A prepreg was obtained in the same manner as in Example 3, except that the screen printing plate was changed to a screen printing plate in which dots (circles) having a diameter of 200 μm were disposed in a lattice state at intervals of 10 mm in the width direction and the length direction, respectively. A shape of the conductive material paste after screen printing was in a hemispherical shape having a diameter of 140 μm and a height of 40 μm. In addition, a blending amount of the conductive material was 0.008 wt % (relative to the matrix resin) in the prepreg, and a volume ratio thereof was 0.003 vol %.

A volume resistivity measuring sample was formed using the produced prepreg, and the conductivity of the fiber-reinforced composite material was evaluated. An electrical resistivity of the obtained fiber-reinforced composite material showed 190 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 26

A prepreg was obtained in the same manner as in Example 3, except that the screen printing plate was changed to a screen printing plate in which dots (circles) having a diameter of 200 μm in were disposed in a lattice state at intervals of 15 mm in the width direction and the length direction, respectively. A shape of the conductive material paste after screen printing was in a hemispherical shape having a diameter of 140 μm and a height of 40 μm. In addition, a blending amount of the conductive material was 0.004 wt % relative to the matrix resin in the prepreg, and a volume ratio thereof was 0.001 vol %.

A volume resistivity measuring sample was formed using the produced prepreg, and the conductivity of the fiber-reinforced composite material was evaluated. An electrical resistivity of the obtained fiber-reinforced composite material showed 190 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 27

A prepreg was obtained in the same manner as in Example 3, except that the screen printing plate was changed to a screen printing plate in which dots (circles) having a diameter of 200 μm were disposed in a lattice state at intervals of 20 mm in the width direction and the length direction, respectively. A shape of the conductive material paste after screen printing was in a hemispherical shape having a diameter of 140 μm and a height of 40 μm. In addition, a blending amount of the conductive material was 0.002 wt % relative to the matrix resin in the prepreg, and a volume ratio thereof was 0.001 vol %.

A volume resistivity measuring sample was formed using the produced prepreg, and the conductivity of the fiber-reinforced composite material was evaluated. An electrical resistivity of the obtained fiber-reinforced composite material showed 200 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 28

A prepreg was obtained in the same manner as in Example 3, except that the screen printing plate was changed to a screen printing plate in which dots (circles) having a diameter of 200 μm were disposed in a lattice state at intervals of 2.5 mm in the width direction and the length direction, respectively. A shape of the conductive material paste after screen printing was in a hemispherical shape having a diameter of 140 μm and a height of 40 μm. In addition, a blending amount of the conductive material was 0.13 wt % relative to the matrix resin in the prepreg, and a volume ratio thereof was 0.044 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the inter laminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 29

A prepreg was obtained in the same manner as in Example 3, except that the screen printing plate was changed to a screen printing plate in which dots (circles) having a diameter of 200 μm were disposed in a lattice state at intervals of 1 mm in the width direction and the length direction, respectively. A shape of the conductive material paste after screen printing was in a hemispherical shape having a diameter of 140 μm and a height of 40 μm. In addition, a blending amount of the conductive material was 0.82 wt % relative to the matrix resin in the prepreg, and a volume ratio thereof was 0.28 vol %.

A volume resistivity measuring sample was formed using the produced prepreg, and the conductivity of the fiber-reinforced composite material was evaluated. An electrical resistivity of the obtained fiber-reinforced composite material showed 180 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Example 30

Carbon fiber strands (Tenax IMS60 (trade name)) serving as a conductive fiber were washed with acetone, thereby removing an attached sizing agent. Subsequently, an epoxy resin-based sizing agent having flaky graphite (BF-1AT ϕ1 μm, manufactured by Ito Graphite Co., Ltd.) mixed therewith was given to the carbon graphite strands from which the sizing agent had been removed, thereby obtaining carbon fiber strands in which the flaky graphite was attached onto the fiber surface. An attachment amount of the flaky graphite was 1.0% of the fiber weight. A prepreg was obtained in the same manner as in Example 7, except that a conductive fiber base material (fiber areal weight: 190 g/m$^2$) resulting from arranging the flaky graphite-attached carbon fiber strands in parallel in one direction was used; and that the conductive paste 7 was used. A shape of the conductive material paste after screen printing was in a hemispherical shape having a diameter of 140 μm and a height of 40 μm. In addition, a blending amount of the conductive material was 0.037 wt % relative to the matrix resin in the prepreg, and a volume ratio thereof was 0.011 vol %.

A volume resistivity measuring sample was formed using the produced prepreg, and the conductivity of the fiber-reinforced composite material was evaluated. An electrical resistivity of the obtained fiber-reinforced composite material showed 13 Ω·cm.

As a result of observing a cross section of the fiber-reinforced composite material with an electron microscope, a region where the conductive material dispersed in the resin was localized and existed in a high density in each of the interlaminar resin layers of the carbon fiber layer traversed in the thickness direction of the resin layer and existed coming into contact with the carbon fiber layer. In addition, the resin in the region containing the conductive material in a high density was integrated with a matrix resin in other region to form a continuous phase.

Comparative Example 1

In a kneading apparatus, 10 parts by mass of the thermoplastic resin A was added to 50 parts by mass of MY600 and 50 parts by mass of MY721, and the contents were stirred with a stirrer at 120° C. for 30 minutes to completely dissolve the thermoplastic resin A, followed by cooling to a resin temperature of 80° C. or lower. Thereafter, 30 parts by mass of the thermoplastic resin B was kneaded, and 45 parts by mass of 4,4'-DDS was further kneaded, thereby preparing an epoxy resin composition. The prepared resin composition was applied on a release paper by using a film coater, thereby producing a resin film for impregnation of 40 g/m².

Onto both surfaces of the conductive fiber base material, the resin film for impregnation was stuck, and the resin composition was impregnated in the conductive fiber base material by a hot-melt method, thereby producing a primary prepreg.

Subsequently, in a kneading machine, 10 parts by mass of the polyethersulfone 5003P (thermoplastic resin A) serving as a soluble thermoplastic resin was newly added to 50 parts by mass of MY0600 and 50 parts by mass of MY721 each serving as an epoxy resin, and the contents were stirred with a stirrer at 120° C. for 30 minutes, thereby completely dissolving the thermoplastic resin A to prepare an epoxy resin composition. The prepared epoxy resin composition was applied on a release film, by using a film coater, thereby obtaining a resin film for surface layer (resin weight, per unit: 10 g/m²).

Onto a surface of the obtained resin film for surface layer, the primary prepreg was stuck so as to come into contact with the epoxy resin composition, thereby preparing a secondary prepreg.

A volume resistivity measuring sample was formed using the produced prepreg, and the conductivity of the fiber-reinforced composite material was evaluated. An electrical resistivity of the obtained fiber-reinforced composite material showed 3,300 Ω·cm.

Comparative Example 2

In a kneading apparatus, 10 parts by mass of the thermoplastic resin A was added to 50 parts by mass of MY600 and 50 parts by mass of MY721, and the contents were stirred with a stirrer at 120° C. for 30 minutes to completely dissolve the thermoplastic resin A, followed by cooling to a resin temperature of 80° C. or lower. Thereafter, 30 parts by mass of the thermoplastic resin B was kneaded, and 45 parts by mass of 4,4'-DDS and 1 part, by mass of carbon black were further kneaded, thereby preparing an epoxy resin composition. The prepared resin composition was applied on a release paper by using a film coater, thereby producing a resin film for impregnation of 40 g/m².

Onto both surfaces of the conductive fiber base material, the resin film for impregnation was stuck, and the resin composition was impregnated in the conductive fiber base material by a hot-melt method, thereby producing a primary prepreg.

Subsequently, in a kneading machine, 10 parts by mass of the polyethersulfone 5003P (thermoplastic resin A) serving as a soluble thermoplastic resin was newly added to 50 parts by mass of MY0600 and 50 parts by mass of MY721 each serving as an epoxy resin, and the contents were stirred with a stirrer at 120° C. for 30 minutes, thereby completely dissolving the thermoplastic resin A to prepare an epoxy resin composition.

The prepared epoxy resin composition was applied on a release film by using a film coater, thereby obtaining a resin film for surface layer (resin weight, per unit: 10 g/m²). Onto a surface of the obtained resin film for surface layer, the primary prepreg was stuck so as to come into contact with the epoxy resin composition, thereby preparing a secondary prepreg.

A volume resistivity measuring sample was formed using the produced prepreg in the above-described method, and the conductivity of the fiber-reinforced composite material was evaluated.

An electrical resistivity of the obtained fiber-reinforced composite material, showed 3,300 Ω·cm.

Comparative Example 3

Using the prepreg obtained in Comparative Example 1, the interlaminar toughness (GIc) of the fiber-reinforced composite material was evaluated by the above-described method. The GIc of the composite material obtained using the prepreg obtained in Comparative Example 1 was 507.5 J/m².

Comparative Example 4

Using the prepreg obtained in Comparative Example 2, the GIc was evaluated. The GIc of the composite material obtained using the prepreg obtained in Comparative Example 2 was 420 J/m², the value of which was lower than the GIc of the composite material obtained using the prepreg obtained in Comparative Example 1. Thus, it was confirmed that the physical properties of the composite material were lowered due to the presence of the conductive material.

Example 31

Using the prepreg obtained in Example 3, the GIc was evaluated. The GIc of the composite material obtained using the prepreg obtained in Example 3 was 525 J/m². The GIc of the composite material obtained using the prepreg obtained in Example 3 is equal to or higher than the GIc of the composite material obtained using the prepreg obtained in Comparative Example 1. Thus, in accordance with the prepreg of the present invention, it could be confirmed that a composite material having both high conductivity and physical properties of the composite material is obtained.

The invention claimed is:
1. A prepreg comprising conductive fibers impregnated with a matrix resin,
the prepreg being a prepreg having a conductive region where a conductive material having an aspect ratio of 1 to 1,000 is dispersed in the resin such that the rate of volume occupation of the conductive material occupying the conductive region is 20 to 95 volume %,
wherein the area of the conductive region occupying the cross-sectional area in the planar direction is 0.001 to 5%.
2. The prepreg according to claim 1, wherein a resin layer composed of at least the matrix resin is present on one or both surfaces of a conductive fiber layer composed of at least the conductive fibers, and the conductive region is present at least in the resin layer.

3. The prepreg according to claim 2, wherein the conductive region is present continuously in the thickness direction.

4. The prepreg according to claim 1, wherein the conductive region is present continuously in the thickness direction.

5. The prepreg according to claim 1, wherein a volume resistivity of the conductive region is 1/1,000 or less of that of other regions of the matrix resin.

6. The prepreg according to claim 1, wherein the conductive region is a conductive region where the conductive material is dispersed in the matrix resin.

7. The prepreg according to claim 1, wherein the resin in the conductive region forms a continuous phase with the matrix resin in other regions.

8. The prepreg according to claim 1, wherein the conductive region is present discontinuously in a dotted state or island state in a cross section of the planar direction.

9. The prepreg according to claim 1, wherein the minimum diameter of the conductive material is smaller than the fiber diameter of the conductive fiber.

10. The prepreg according to claim 1, wherein the addition amount of the conductive material occupying the whole of the prepreg is 1 mass % or less.

11. The prepreg according to claim 1, wherein the rate of volume occupation of the conductive region occupying the matrix resin is 5 volume % or less.

12. A fiber-reinforced composite material which is produced by laminating and forming the prepreg according to claim 1.

13. A fiber-reinforced composite material comprising conductive fibers impregnated with a matrix resin, the fiber-reinforced composite material having a conductive region where a conductive material having an aspect ratio of 1 to 1,000 is dispersed in the resin such that the rate of volume occupation of the conductive material occupying the conductive region is 20 to 95 volume %, wherein the area of the conductive region occupying the cross-sectional area in the planar direction is 0.001 to 5%.

14. The fiber-reinforced composite material according to claim 13, wherein a resin layer composed of at least a matrix resin is present between layers resulting from laminating conductive fiber layers composed of at least conductive fibers and a matrix resin, and the conductive region is present at least in the resin layer.

15. A method for producing a prepreg including localizing the conductive material in a part of the prepreg to form a conductive region where the conductive material is dispersed in the resin, comprising laminating a resin film composed of a matrix resin composition on a conductive fiber base material and integrating the matrix resin composition with the conductive fiber base material, the resin film being a conductive material-localized resin film in which a conductive material as a conductive material paste having the conductive material having an aspect ratio of 1 to 1,000 dispersed in a dispersant such that the rate of volume occupation of the conductive material occupying the paste is 20 to 95 volume % is localized in a part of the film composed of the matrix resin composition, wherein the area of the conductive region occupying the cross-sectional area in the planar direction is 0.001 to 5%.

16. The method for producing a prepreg according to claim 15, wherein the conductive material-localized resin film is a conductive material-localized resin film obtained by disposing the conductive material on a surface of the film composed of the matrix resin.

17. The method for producing a prepreg according to claim 16, wherein the conductive material-localized resin film is a conductive material-localized resin film obtained by disposing the conductive material on a support and then transferring the conductive material onto the film composed of the matrix resin.

18. The method for producing a prepreg according to claim 15, wherein the conductive material-localized resin film is a conductive material-localized resin film obtained by disposing the conductive material on a support and then transferring the conductive material onto the film composed of the matrix resin.

* * * * *